United States Patent
Dai et al.

(10) Patent No.: US 10,457,869 B2
(45) Date of Patent: *Oct. 29, 2019

(54) LIQUID CRYSTAL COMPOSITION AND LIQUID CRYSTAL DISPLAY DEVICE

(71) Applicant: JIANGSU HECHENG DISPLAY TECHNOLOGY CO., LTD., Jiangsu (CN)

(72) Inventors: Huijuan Dai, Jiangsu (CN); Wenming Han, Jiangsu (CN); Wenquan Ding, Jiangsu (CN); Pengfei Li, Jiangsu (CN); Haibin Xu, Jiangsu (CN); Di He, Jiangsu (CN); Yunyun Liu, Jiangsu (CN); Lifang Yao, Jiangsu (CN); Wenyang Ma, Jiangsu (CN); Dingfu Ma, Jiangsu (CN); Heming Zhang, Jiangsu (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 80 days.

This patent is subject to a terminal disclaimer.

(21) Appl. No.: 15/568,611

(22) PCT Filed: Apr. 21, 2016

(86) PCT No.: PCT/CN2016/079939
§ 371 (c)(1),
(2) Date: Oct. 23, 2017

(87) PCT Pub. No.: WO2016/169498
PCT Pub. Date: Oct. 27, 2016

(65) Prior Publication Data
US 2018/0037818 A1 Feb. 8, 2018

(30) Foreign Application Priority Data

Apr. 23, 2015 (CN) .......................... 2015 1 0197266

(51) Int. Cl.
| | | |
|---|---|---|
| *G02F 1/1333* | (2006.01) | |
| *C09K 19/34* | (2006.01) | |
| *C09K 19/04* | (2006.01) | |
| *G02F 1/1362* | (2006.01) | |

(52) U.S. Cl.
CPC .. *C09K 19/3402* (2013.01); *C09K 2019/0466* (2013.01); *C09K 2019/3422* (2013.01); *G02F 1/1362* (2013.01)

(58) Field of Classification Search
CPC .... C09K 19/3402; C09K 19/12; C09K 19/20; C09K 19/3066; C09K 19/32; C09K 19/3405; C09K 19/42; C09K 2019/0466; C09K 2019/122; C09K 2019/3422; G02F 1/13; G02F 1/1362; G02F 1/1333
USPC ..................................................... 252/299.61
See application file for complete search history.

(56) References Cited

U.S. PATENT DOCUMENTS

| | | |
|---|---|---|
| 6,861,107 B2 | 3/2005 | Klasen-Memmer et al. |
| 7,763,329 B2 | 7/2010 | Wittek et al. |
| 8,012,369 B2 | 9/2011 | Saito et al. |
| 8,277,684 B2 | 10/2012 | Klasen-Memmer et al. |
| 8,642,142 B2 | 2/2014 | Hattori et al. |
| 9,365,772 B2 | 6/2016 | Hattori et al. |
| 9,453,163 B2 | 9/2016 | Furusato et al. |
| 9,499,745 B2 | 11/2016 | Yanai et al. |
| 2009/0091703 A1 | 4/2009 | Matsumura et al. |
| 2017/0313939 A1 | 11/2017 | Jiang et al. |
| 2018/0105747 A1* | 4/2018 | Liu ................... C09K 19/12 |
| 2018/0119011 A1* | 5/2018 | Ma ................... C09K 19/12 |
| 2018/0142154 A1* | 5/2018 | Han ................... C09K 19/44 |

FOREIGN PATENT DOCUMENTS

| | | |
|---|---|---|
| CN | 1475547 A | 2/2004 |
| CN | 101157862 A | 4/2008 |
| CN | 101652453 A | 2/2010 |
| CN | 101796162 A | 8/2010 |
| CN | 102858918 A | 1/2013 |
| CN | 103254906 A | 8/2013 |
| CN | 103254911 A | 8/2013 |
| CN | 103305231 A | 9/2013 |
| CN | 104087312 A | 10/2014 |
| CN | 104204137 A | 12/2014 |
| CN | 105505402 A | 4/2016 |
| EP | 2757139 A1 | 7/2014 |
| TW | 201422790 A | 6/2014 |
| WO | 2014087873 A1 | 6/2014 |
| WO | 2014147822 A1 | 9/2014 |

* cited by examiner

*Primary Examiner* — Geraldina Visconti
(74) *Attorney, Agent, or Firm* — Hoffmann & Baron, LLP

(57) ABSTRACT

A liquid crystal composition comprises a compound of general formula I serving as a first component; a compound of general formula II-1 and/or general formula II-2 serving as a second component; a compound of general formula III serving as a third component; a compound of general formula IV serving as a fourth component; a compound of general formula V serving as a fifth component; and a compound of general formula VI serving as a sixth component. The liquid crystal composition has at least one characteristic among the characteristics of a large dielectric anisotropy, a large optical anisotropy, a high voltage holding ratio and a low threshold voltage and the like, and is suitable to be used in a liquid crystal display device. Additionally, a liquid crystal display device comprising the liquid crystal composition is also provided.

14 Claims, No Drawings

LIQUID CRYSTAL COMPOSITION AND LIQUID CRYSTAL DISPLAY DEVICE

TECHNICAL FIELD

The present invention relates to a liquid crystal composition, and specifically relates to a liquid crystal composition having a larger optical anisotropy, a larger dielectric anisotropy, a suitable clearing point and a lower viscosity, and a liquid crystal display device comprising the liquid crystal composition.

BACKGROUND ARTS

Regarding a liquid crystal display device, based on the displaying mode of the liquid crystal, it can be classified into the types of PC (phase change), TN (twisted nematic), STN (super twisted nematic), ECB (electrically controlled birefringence), OCB (optically compensated bend), IPS (in-plane switching), VA (vertical alignment) and the like. Based on the driving mode of the device, it can be classified into the PM (passive matrix) type and the AM (active matrix) type. PM is classified into the static type, multiplex type and so forth. AM is classified into TFT (thin film transistor) type, MIM (metal insulator metal) type and so forth. The types of TFT comprise amorphous silicon and polycrystal silicon. The latter is classified into a high temperature type and a low temperature type according to the manufacturing process. Based on the type of the light source, the liquid crystal display device is classified into a reflection type utilizing a natural light, a transmission type utilizing a backlight and a semi-transmission type utilizing both the natural light and the backlight.

TABLE 1

The general characteristics of the composition and the AM device

| No. | The general characteristics of the composition | The general characteristics of the AM device |
| --- | --- | --- |
| 1 | Temperature range of a nematic phase is wide. | Usable temperature range is wide. |
| 2 | Viscosity is small. | Response time is short. |
| 3 | Optical anisotropy is suitable. | Contrast ratio is large. |
| 4 | Dielectric anisotropy is positively or negatively large. | Threshold voltage is low, electric power consumption is small, and a contrast ratio is large. |
| 5 | Specific resistance is large. | Voltage holding ratio is large, and a contrast ratio is large. |
| 6 | Stable to ultraviolet light and heat. | Service life is long. |

Liquid crystal materials are required to have an appropriately high dielectric anisotropy, optical anisotropy and a good low-temperature intersolubility and heat stability. In addition, the liquid crystal materials should have a low viscosity, a short response time, a low threshold voltage and a high contrast ratio. The various performance index of the composition will be further explained based on a commercially available crystal liquid display device. The temperature range of a nematic phase relates to the working temperature range of the device. A desirable upper limit temperature of the nematic phase is 70° C. or more, and a desirable lower limit temperature of the nematic phase is −10° C. or less. The viscosity of the composition relates to the response time of the device. A short response time of the device is desirable for displaying a moving image in the device. Accordingly, a small viscosity of the composition is desirable, and a small viscosity of the composition at a low temperature is more desirable.

The optical anisotropy of the composition relates to the contrast ratio of the device. In order to maximize the contrast ratio of the liquid crystal display device, the product value ($\Delta n \ast d$) of the optical anisotropy ($\Delta n$) of the liquid crystal composition and the thickness (d) of the liquid crystal layer can be designed to be a fixed value. A suitable product value depends on the kind of operation mode. In a device having a TN mode, a suitable value is approximately 0.45 μm. In this case, a composition having a large optical anisotropy is desirable for a device having a small thickness of the liquid crystal layer.

The contrast ratio of a liquid crystal display device can be increased by including a liquid crystal composition having a larger optical anisotropy.

A liquid crystal display device containing a liquid crystal composition having a large absolute value of dielectric anisotropy can decrease the base voltage value and the driving voltage, and can further decrease the electric power consumption. There is an inverse relation between the absolute value of dielectric anisotropy and the driving voltage. A liquid crystal display device with a liquid crystal composition having a low driving voltage value can effectively decrease the power consumption of the display, and therefore, consumables, such as mobile phones, tablet PCs and other portable electronic products, may have a longer endurance.

The risk of the residual image occurrence can be reduced for a liquid crystal display device containing a liquid crystal composition having a higher voltage holding ratio, and therefore, the service life of the liquid crystal display device can be prolonged.

It is usually difficult for a single liquid crystal compound to present its characteristics, thus a composition is normally prepared by mixing the single compound with a variety of other liquid crystal compounds. Although the liquid crystal compositions in the prior art can present better characteristics, these liquid crystal compositions (e.g., liquid crystal compositions disclosed in CN101796162A and CN1475547A) all have the following disadvantages in varying degrees: optical anisotropy is not large enough, dielectric anisotropy is relatively low, clearing point is relatively low, viscosity is relatively high, and voltage holding ratio is low, which directly result in that the liquid crystal devices using these liquid crystal compositions have a low contrast ratio, a frequent residual image occurrence, a large electric power consumption and other defects.

Therefore, there is a need for a liquid crystal composition with at least one characteristic among the characteristics of a large optical anisotropy, a large dielectric anisotropy, a low threshold voltage, a high voltage holding ratio, such that the liquid crystal device may have a higher displaying contrast ratio and the like.

SUMMARY OF THE INVENTION

The object of the present invention is to provide a liquid crystal composition having characteristics of a large dielectric anisotropy, a large optical anisotropy, a high voltage holding ratio and a low threshold voltage and the like.

Another object of the present invention is to provide a liquid crystal display device, which comprises a liquid crystal composition having characteristics of a large dielectric anisotropy, a large optical anisotropy, a high voltage holding ratio and a low threshold voltage and the like, so that the liquid crystal display device possesses a high contrast ratio and a superior power saving performance.

In order to achieve the aforementioned objects of the present invention, the present invention provides a liquid crystal composition which comprises:

5-30% by weight of the total amount of the liquid crystal composition of a first component, said first component being one or more compounds of general formula I

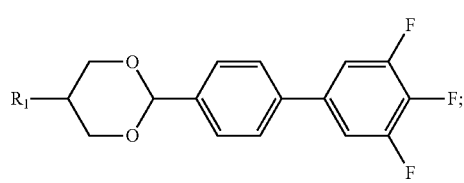

5-25% by weight of the total amount of the liquid crystal composition of a second component, said second component being one or more compounds of general formula II-1 and/or general formula II-2

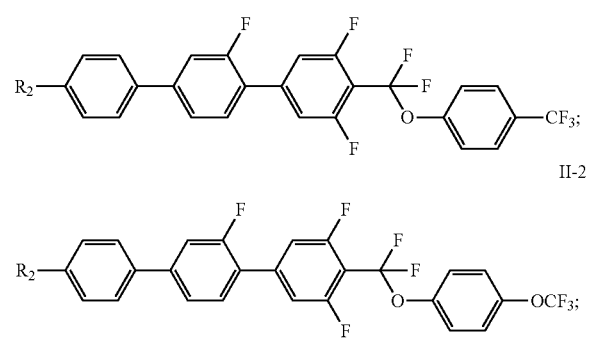

1-15% by weight of the total amount of the liquid crystal composition of a third component, said third component being one or more compounds of general formula III

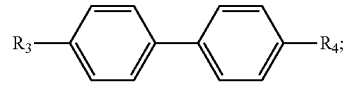

5-50% by weight of the total amount of the liquid crystal composition of a fourth component, said fourth component being one or more compounds of general formula IV

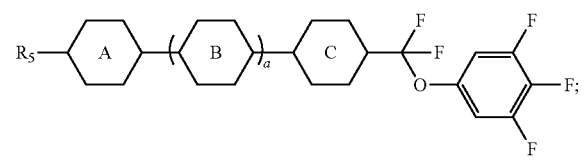

5-45% by weight of the total amount of the liquid crystal composition of a fifth component, said fifth component being one or more compounds of general formula V

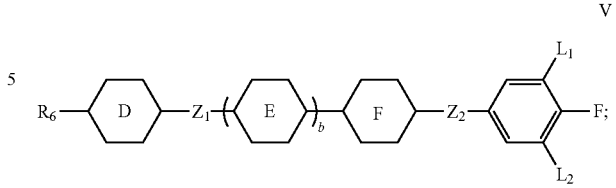

and 1-50% by weight of the total amount of the liquid crystal composition of a sixth component, said sixth component being one or more compounds of general formula VI

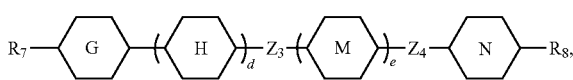

in which:

$R_1$, $R_2$, $R_3$, $R_4$, $R_6$, $R_7$ and $R_8$ are same or different, and each independently represents $C_1$-$C_7$ alkyl substituted by fluorine or unsubstituted by fluorine, $C_1$-$C_7$ alkoxy substituted by fluorine or unsubstituted by fluorine, or $C_2$-$C_7$ alkenyl substituted by fluorine or unsubstituted by fluorine;

$R_5$ represents —H, $C_1$-$C_7$ alkyl substituted by fluorine or unsubstituted by fluorine, $C_1$-$C_7$ alkoxy substituted by fluorine or unsubstituted by fluorine, or $C_2$-$C_7$ alkenyl substituted by fluorine or unsubstituted by fluorine;

represents

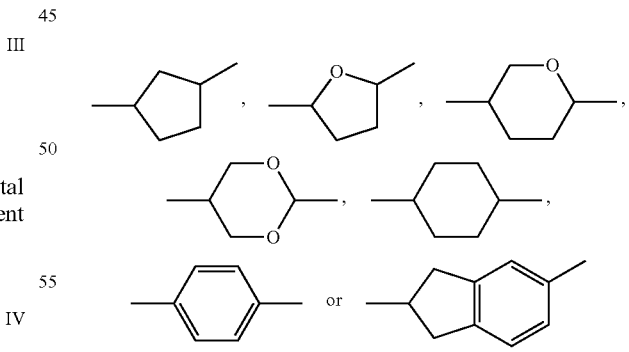

one or more H on the

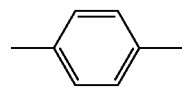

can be substituted by F;
Ring

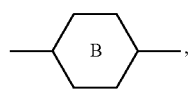, ring

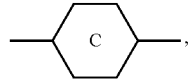, ring

, ring

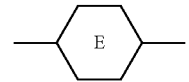, and ring

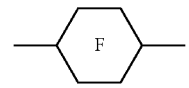

are same or different, and each independently represents

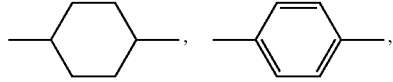

Ring

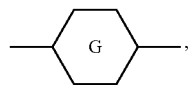, ring

, ring

and ring

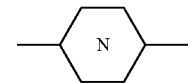

are same or different, and each independently represents

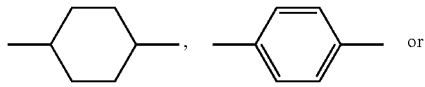 or

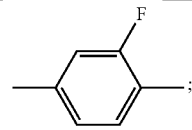;

$L_1$ and $L_2$ are same or different, and each independently represents —H or —F;
$Z_1$ and $Z_2$ are same or different, and each independently represents single bond, —COO—, —CH$_2$CH$_2$— or —CH$_2$O—;
$Z_3$ and $Z_4$ are same or different, and each independently represents single bond, —COO— or —CH$_2$O—;
a represents 0, 1 or 2, and when a is 2, rings

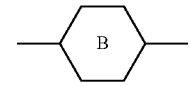

can be same or different;
b, d and e are same or different, and each independently represents 0 or 1;
in which, when d=e=0, d=1 and e=0 or d=0 and e=1, ring

and ring

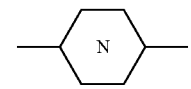

are not simultaneously

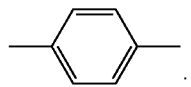

In some embodiments of the present invention, preferably, the first component comprises 5-15% by weight of the total amount of the liquid crystal composition; the second component comprises 10-20% by weight of the total amount of the liquid crystal composition; the third component comprises 1-10% by weight of the total amount of the liquid crystal composition; the fourth component comprises 10-45% by weight of the total amount of the liquid crystal composition; the fifth component comprises 5-35% by weight of the total amount of the liquid crystal composition; and the sixth component comprises 1-50% by weight of the total amount of the liquid crystal composition.

In some embodiments of the present invention, preferably, the compound of general formula II-1 comprises 6-18% by weight of the total amount of the liquid crystal composition.

In some embodiments of the present invention, preferably, the compound of general formula II-2 comprises 0-6% by weight of the total amount of the liquid crystal composition.

In some embodiments of the present invention, $R_1$ represents $C_1$-$C_5$ alkyl.

In some embodiments of the present invention, $R_2$ represents $C_1$-$C_5$ alkyl or $C_2$-$C_4$ alkoxy.

In some embodiments of the present invention, $R_2$ represents $C_1$-$C_5$ alkyl.

In some embodiments of the present invention, $R_3$ represents $C_1$-$C_5$ alkyl; and in some embodiments of the present invention, $R_4$ represents $C_1$-$C_5$ alkyl or $C_2$-$C_5$ alkenyl.

In some embodiments of the present invention, $R_4$ represents $C_1$-$C_5$ alkyl.

In some embodiments of the present invention, $R_4$ represents $C_4$ alkenyl.

In some embodiments of the present invention, $R_4$ represents 3-butenyl.

In some embodiments of the present invention, $R_5$ represents —H or $C_1$-$C_5$ alkyl. Ring

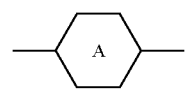

represents

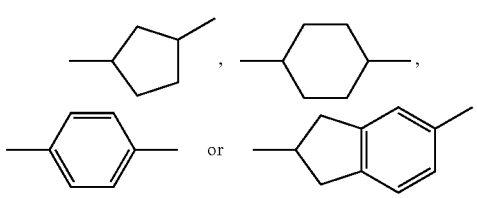

Ring

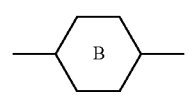

and ring

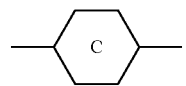

are same or different, and each independently represents

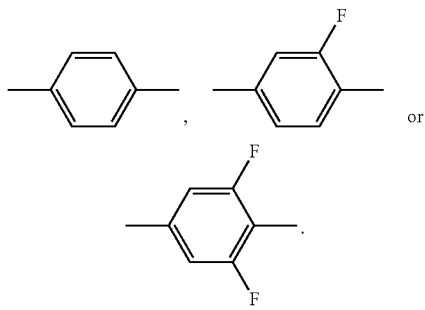

a represents 0 or 1.

In some embodiments of the present invention, $R_5$ represents —H or $C_2$-$C_5$ alkyl.

In some embodiments of the present invention, when ring

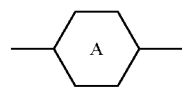

represents

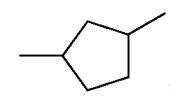

$R_5$ represents —H.

In some embodiments of the present invention, ring

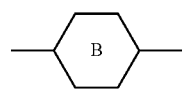

represents

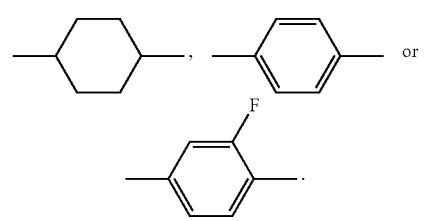

Ring

represents

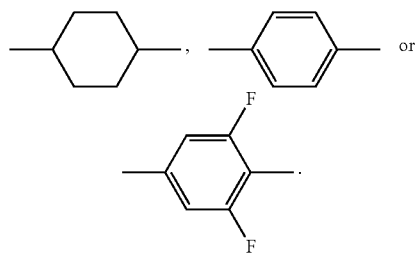

In some embodiments of the present invention, $R_6$ represents $C_1$-$C_5$ alkyl. Ring

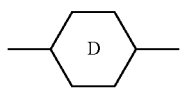

and ring

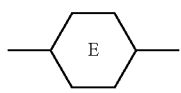

each independently represents

Ring

represents

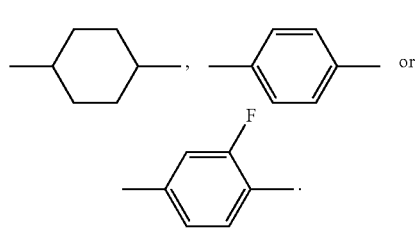

b represents 0 or 1. $Z_2$ represents single bond.

In some embodiments of the present invention, $R_6$ represents $C_2$-$C_5$ alkyl.

In some embodiments of the present invention, $R_6$ represents $C_2$-$C_4$ alkyl.

In some embodiments of the present invention, $R_7$ represents $C_1$-$C_5$ alkyl. $R_8$ represents $C_1$-$C_5$ alkyl, $C_1$-$C_3$ alkoxy substituted by fluorine, or $C_2$-$C_5$ alkenyl. Ring

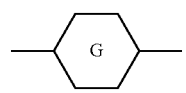

represents

Ring

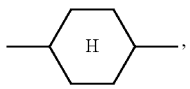

ring

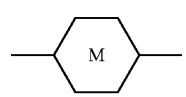

and ring

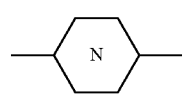

are same or different, and each independently represents

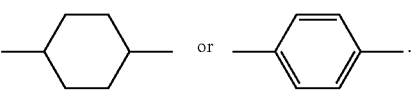

$Z_3$ and $Z_4$ each represents single bond. d and e are same or different, and each independently represents 0 or 1, provided that d and e do not represent 1 simultaneously.

In some embodiments of the present invention, $R_7$ represents $C_3$-$C_5$ alkyl. $R_8$ represents $C_2$-$C_3$ alkyl, —$OCF_3$ or $C_2$-$C_3$ alkenyl.

In some embodiments of the present invention, $R_7$ represents $C_3$-$C_4$ alkyl. $R_8$ represents $C_2$ alkyl.

In some embodiments of the present invention, $R_7$ represents $C_3$ alkyl. $R_8$ represents ethenyl or propenyl.

In some embodiments of the present invention, preferably, the compound of general formula I is selected from a group consisting of the following compounds:

I-1
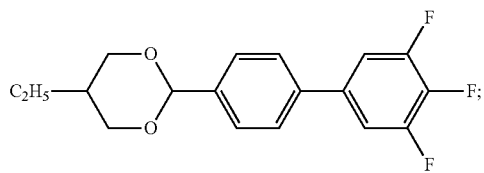
I-2
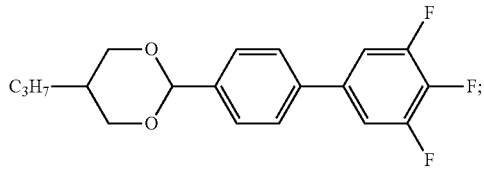
I-3
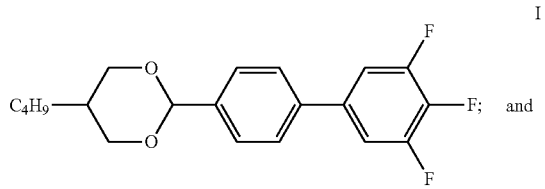; and
I-4
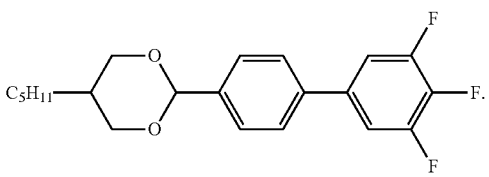.
In some embodiments of the present invention, preferably, the compound of general formula II-1 is selected from a group consisting of the following compounds:
II-1-1
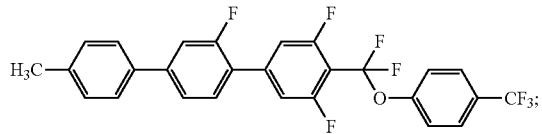
II-1-2
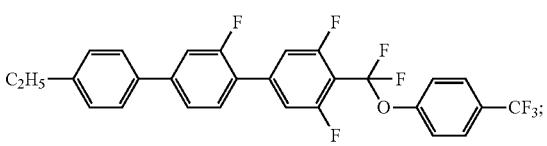
II-1-3
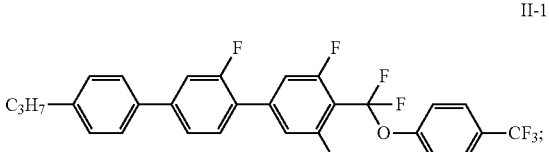
II-1-4
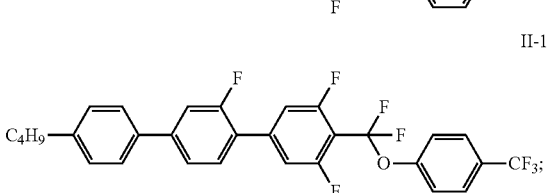
II-1-5
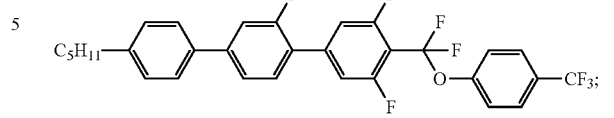
II-1-6
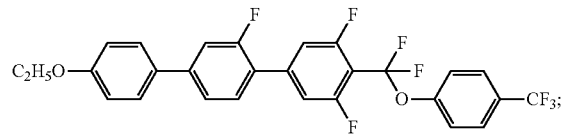
II-1-7
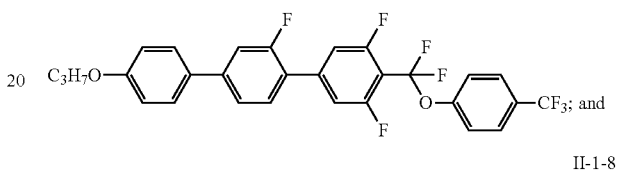; and
II-1-8
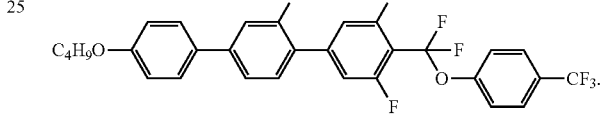.
In some embodiments of the present invention, preferably, the compound of general formula II-2 is selected from a group consisting of the following compounds:
II-2-1
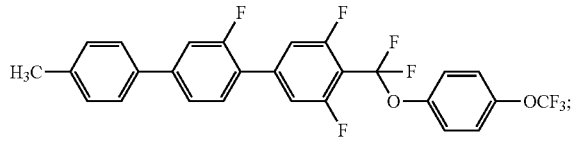
II-2-2
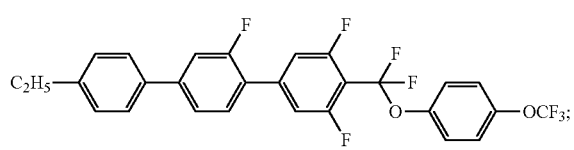
II-2-3
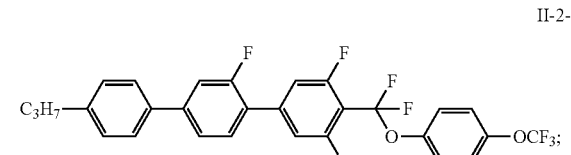
II-2-4
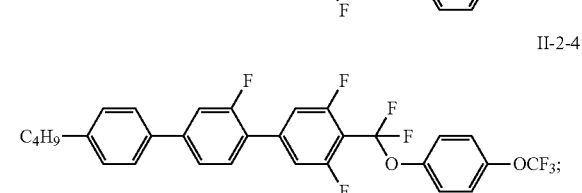

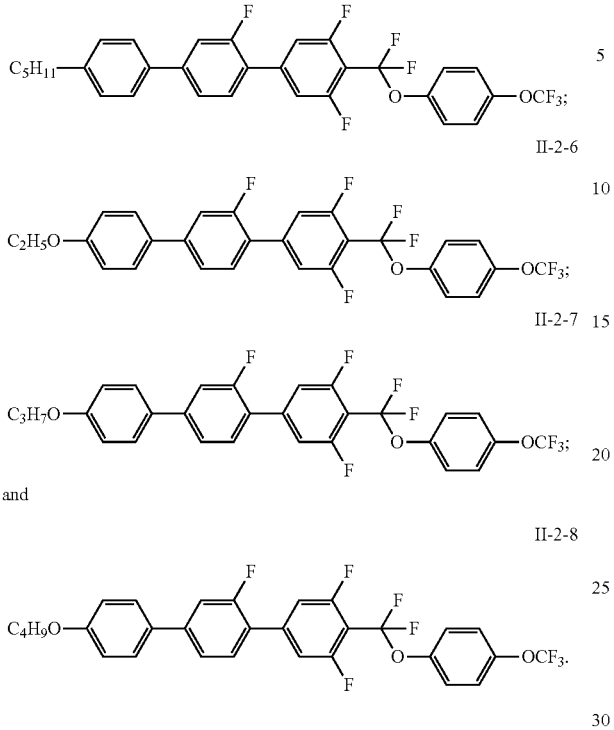
In some embodiments of the present invention, preferably, the compound of general formula III is selected from a group consisting of the following compounds:
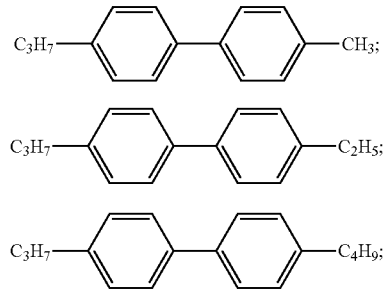
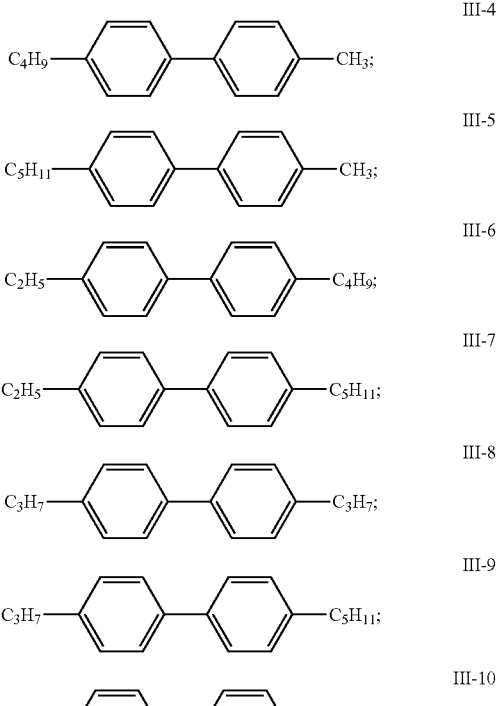
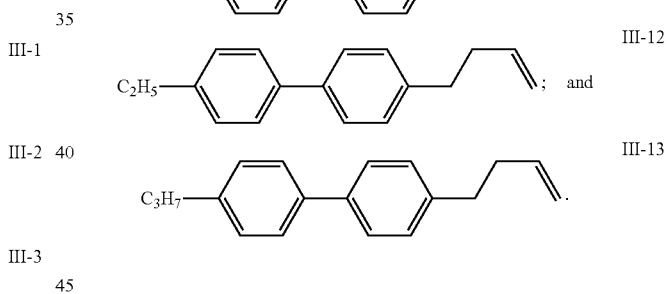
In some embodiments of the present invention, preferably, the compound of general formula IV is selected from a group consisting of the following compounds:
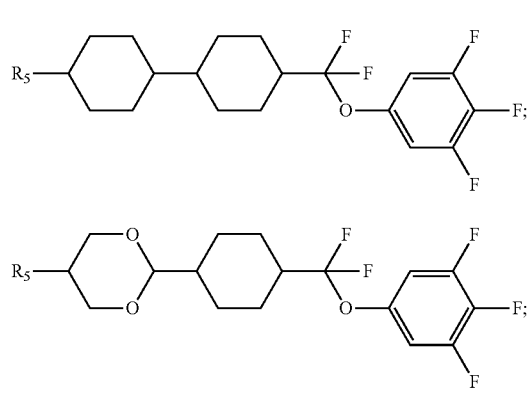
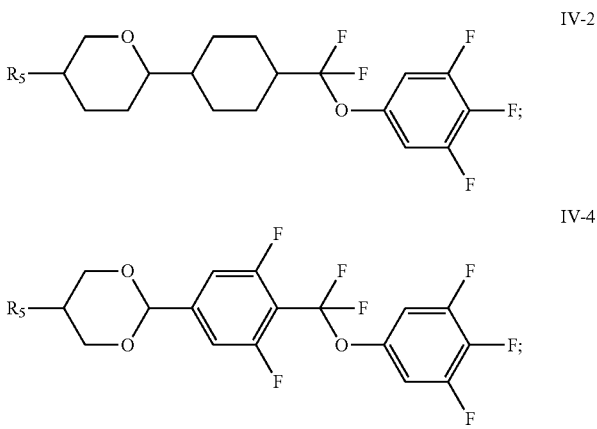

-continued

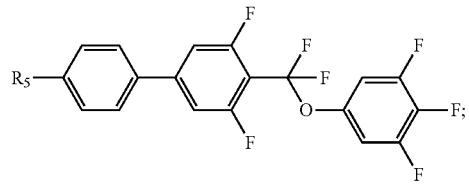
IV-5

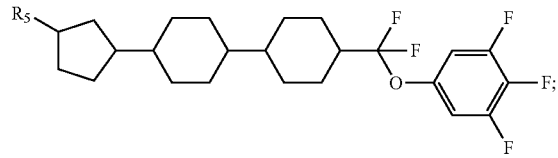
IV-6

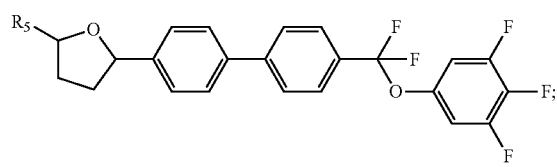
IV-7

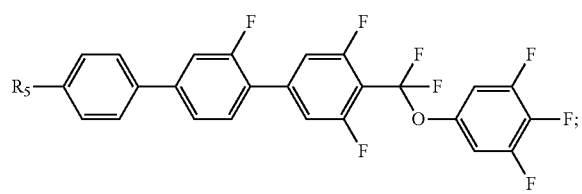
IV-8

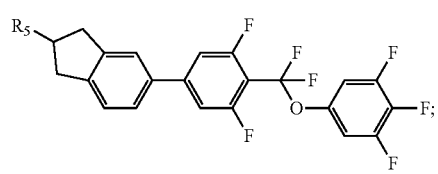
IV-9

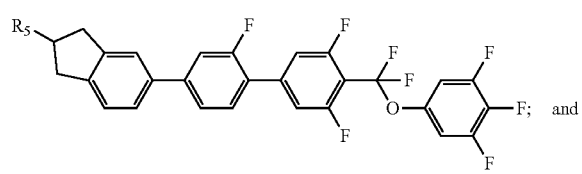
IV-10

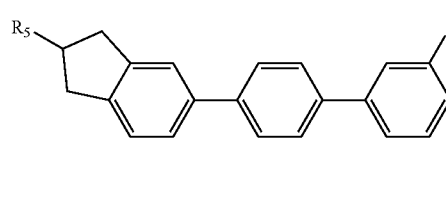
IV-11 in which, $R_5$ represents $C_1$-$C_7$ alkyl substituted by fluorine or unsubstituted by fluorine, $C_1$-$C_7$ alkoxy substituted by fluorine or unsubstituted by fluorine.

In some embodiments of the present invention, preferably, the compound of general formula IV-1 comprises 0-30% by weight of the total amount of the liquid crystal composition; as a preferred technical solution, the compound of general formula IV-1 comprises 20-30% by weight of the total amount of the liquid crystal composition.

In some embodiments of the present invention, preferably, the compound of general formula IV-5 comprises 0-20% by weight of the total amount of the liquid crystal composition; as a preferred technical solution, the compound of general formula IV-5 comprises 10-20% by weight of the total amount of the liquid crystal composition.

In some embodiments of the present invention, preferably, the compound of general formula IV-6 comprises 0-15% by weight of the total amount of the liquid crystal composition.

In some embodiments of the present invention, preferably, the compound of general formula IV-8 comprises 0-20% by weight of the total amount of the liquid crystal composition; as a preferred technical solution, the compound of general formula IV-8 comprises 10-15% by weight of the total amount of the liquid crystal composition.

In some embodiments of the present invention, preferably, the compound of general formula IV-9 comprises 0-25% by weight of the total amount of the liquid crystal composition;

as a preferred technical solution, the compound of general formula IV-9 comprises 2-15% by weight of the total amount of the liquid crystal composition.

In some embodiments of the present invention, preferably, the compound of general formula IV-10 comprises 0-15% by weight of the total amount of the liquid crystal composition.

In some embodiments of the present invention, preferably, the compound of general formula IV-1 is selected from a group consisting of the following compounds:

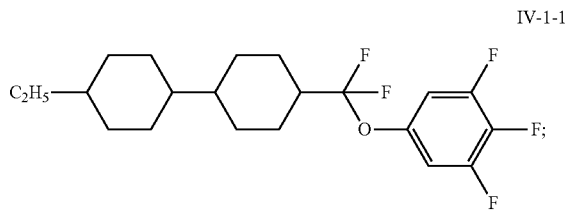
IV-1-1

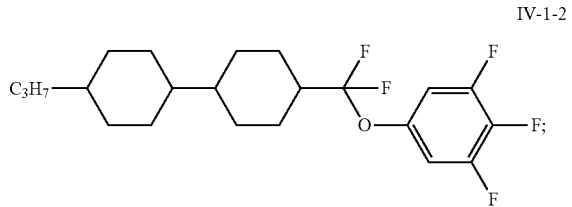
IV-1-2

-continued

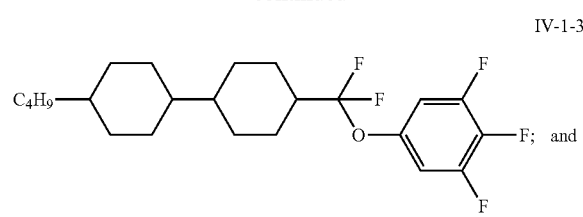
IV-1-3

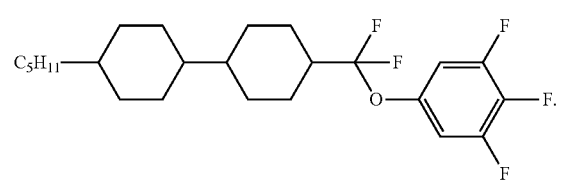
IV-1-4

In some embodiments of the present invention, preferably, the compound of general formula IV-2 is selected from a group consisting of the following compounds:

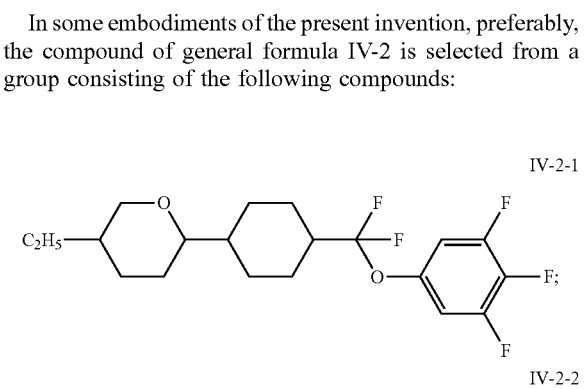
IV-2-1

IV-2-2

IV-2-3

IV-2-4

In some embodiments of the present invention, preferably, the compound of general formula IV-3 is selected from a group consisting of the following compounds:

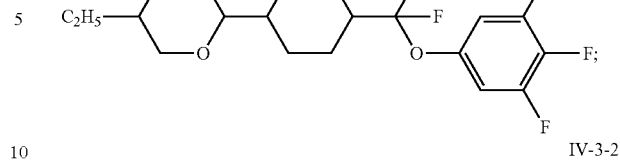
IV-3-1

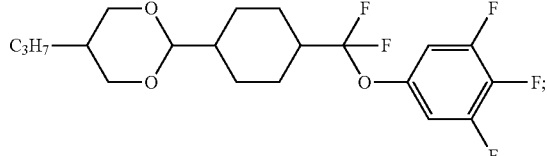
IV-3-2

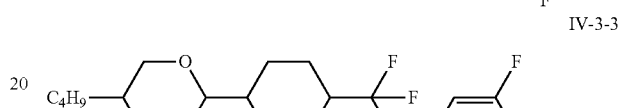
IV-3-3

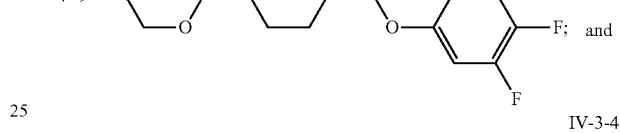
IV-3-4

In some embodiments of the present invention, preferably, the compound of general formula IV-4 is selected from a group consisting of the following compounds:

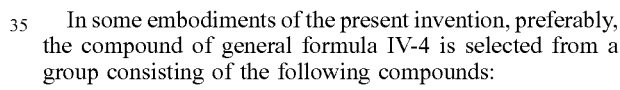
IV-4-1

IV-4-2

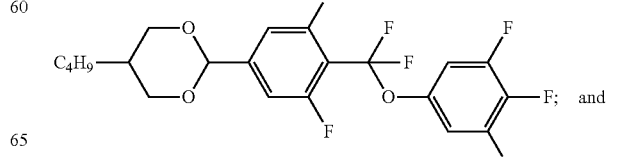
IV-4-3

-continued

IV-4-4

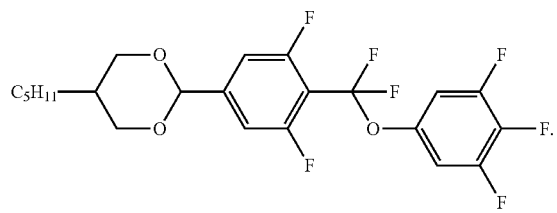

IV-6-1

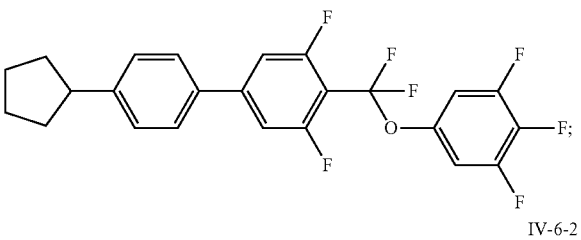

In some embodiments of the present invention, preferably, the compound of general formula IV-5 is selected from a group consisting of the following compounds:

IV-5-1

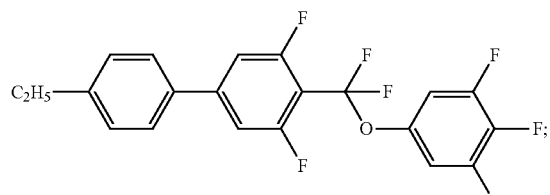

IV-5-2

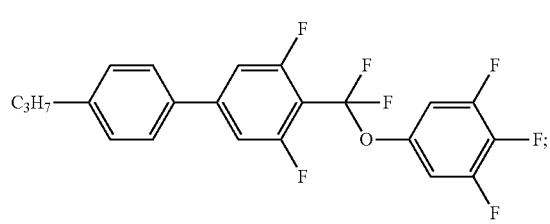

IV-5-3

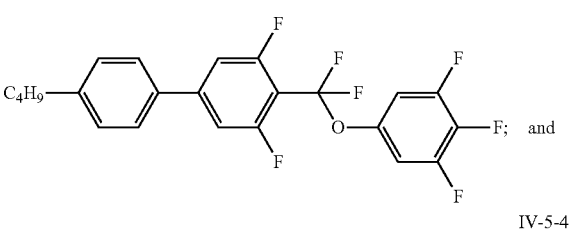

IV-5-4

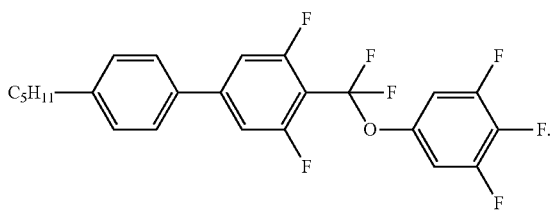

In some embodiments of the present invention, preferably, the compound of general formula IV-6 is selected from a group consisting of the following compounds:

In some embodiments of the present invention, preferably, the compound of general formula IV-7 is selected from a group consisting of the following compounds:

IV-7-1

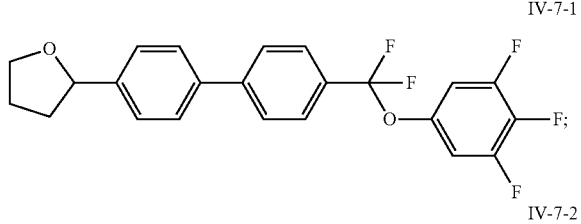

IV-7-2

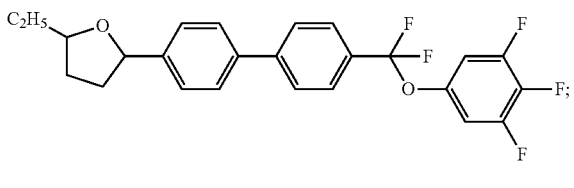

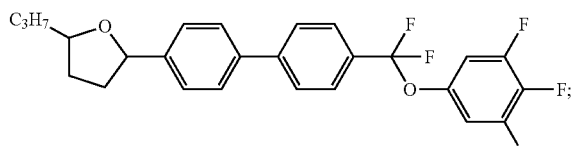
IV-7-3

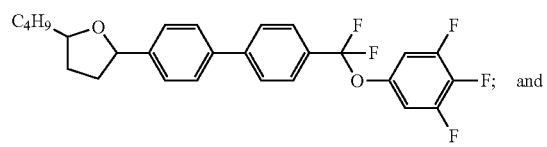
IV-7-4

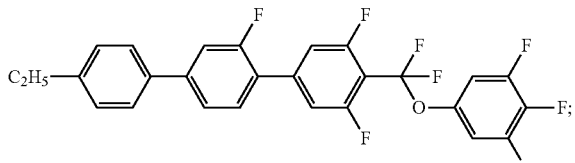
IV-7-5

In some embodiments of the present invention, preferably, the compound of general formula IV-8 is selected from a group consisting of the following compounds:

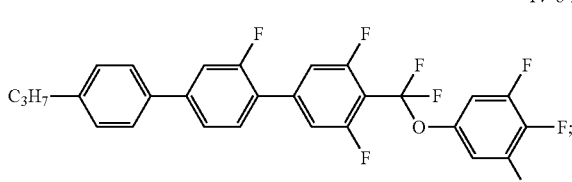
IV-8-1

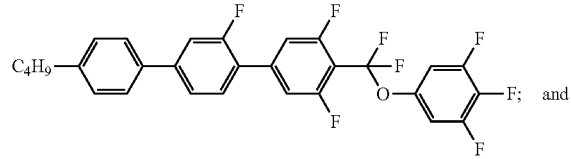
IV-8-2

IV-8-3

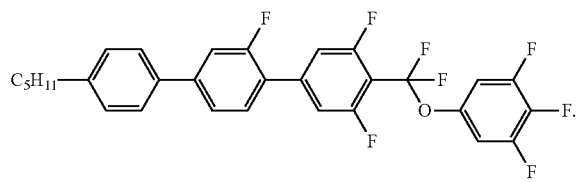
IV-8-4

In some embodiments of the present invention, preferably, the compound of general formula IV-9 is selected from a group consisting of the following compounds:

IV-9-1

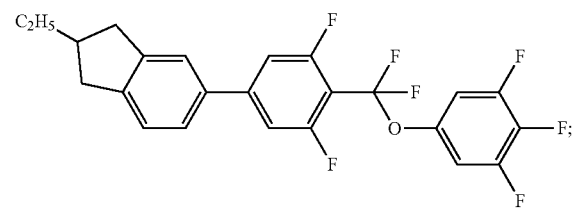
IV-9-2

IV-9-3

IV-9-4

In some embodiments of the present invention, preferably, the compound of general formula IV-10 is selected from a group consisting of the following compounds:

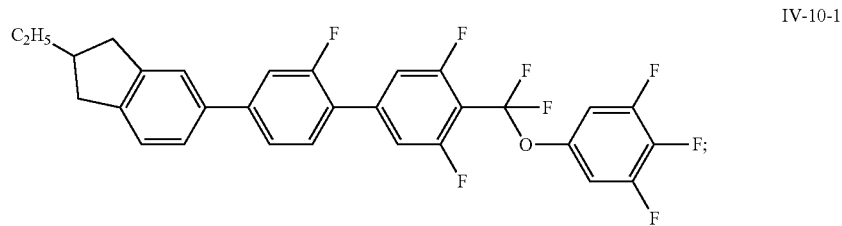
IV-10-1
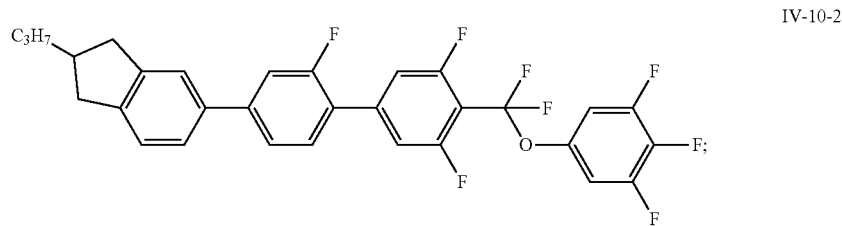
IV-10-2
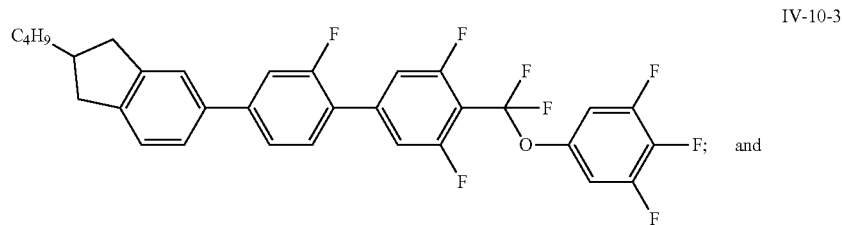
IV-10-3 and
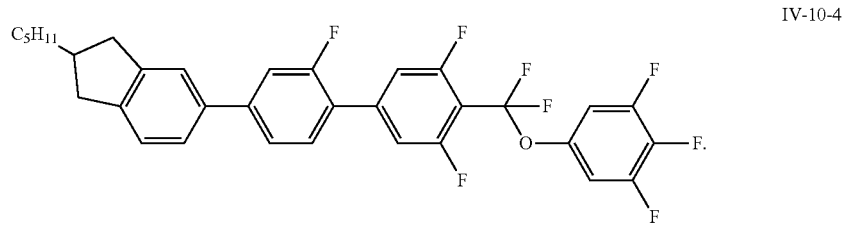
IV-10-4
In some embodiments of the present invention, preferably, the compound of general formula IV-11 is selected from a group consisting of the following compounds:
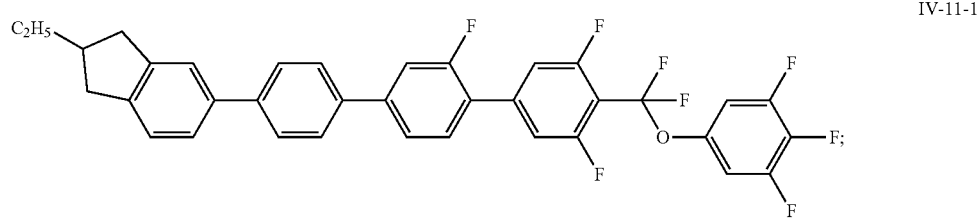
IV-11-1
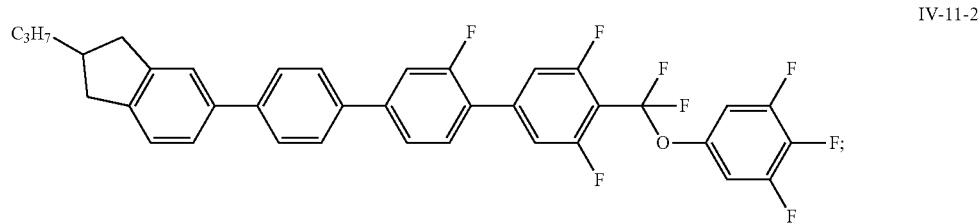
IV-11-2

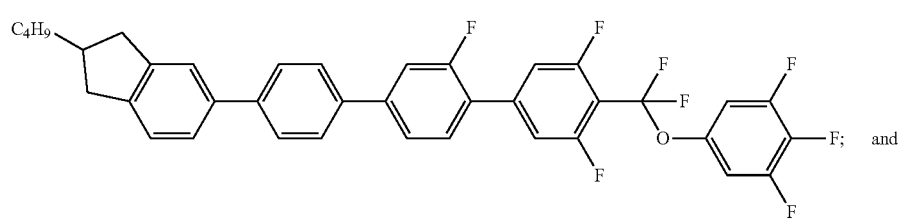
IV-11-3
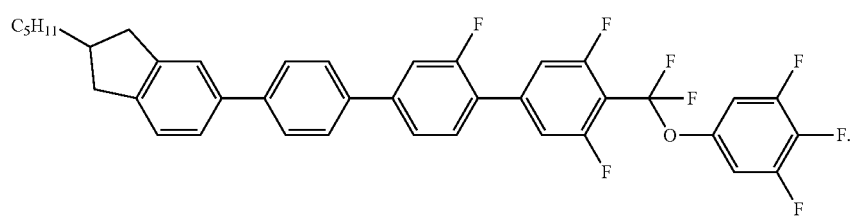
IV-11-4
In some embodiments of the present invention, preferably, the compound of general formula V is selected from a group consisting of the following compounds:
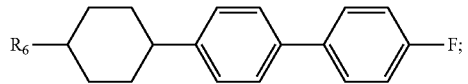
V-1
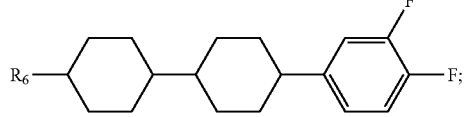
V-2
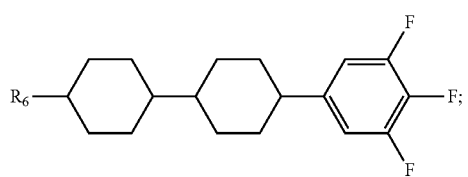
V-3
V-4
V-5
V-6
V-7
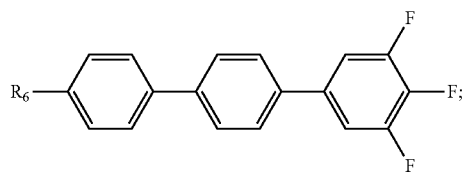
V-8
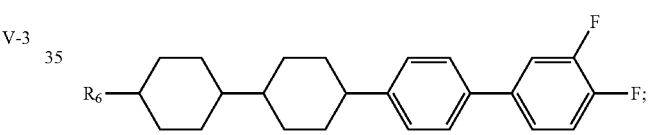
V-9
V-10
V-11
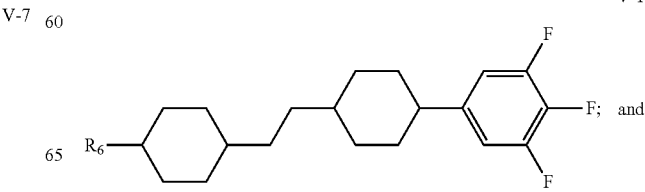
V-12

-continued

V-13

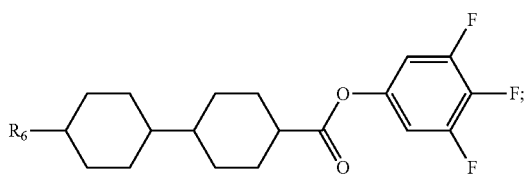

in which,

R$_6$ represents C$_1$-C$_5$ alkyl substituted by fluorine or unsubstituted by fluorine, C$_1$-C$_5$ alkoxy substituted by fluorine or unsubstituted by fluorine, or C$_2$-C$_5$ alkenyl substituted by fluorine or unsubstituted by fluorine.

In some embodiments of the present invention, preferably, the compound of general formula V-3 comprises 0-10% by weight of the total amount of the liquid crystal composition.

In some embodiments of the present invention, preferably, the compound of general formula V-4 comprises 0-10% by weight of the total amount of the liquid crystal composition.

In some embodiments of the present invention, preferably, the compound of general formula V-5 comprises 0-15% by weight of the total amount of the liquid crystal composition; as a preferred technical solution, the compound of general formula V-5 comprises 5-11% by weight of the total amount of the liquid crystal composition.

In some embodiments of the present invention, preferably, the compound of general formula V-6 comprises 0-15% by weight of the total amount of the liquid crystal composition; as a preferred technical solution, the compound of general formula V-6 comprises 4-11% by weight of the total amount of the liquid crystal composition.

In some embodiments of the present invention, preferably, the compound of general formula V-7 comprises 0-10% by weight of the total amount of the liquid crystal composition.

In some embodiments of the present invention, preferably, the compound of general formula V-10 comprises 0-25% by weight of the total amount of the liquid crystal composition; as a preferred technical solution, the compound of general formula V-10 comprises 10-22% by weight of the total amount of the liquid crystal composition.

In some embodiments of the present invention, preferably, the compound of general formula V-1 is selected from a group consisting of the following compounds:

V-1-1
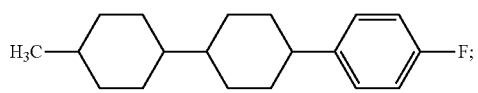

V-1-2
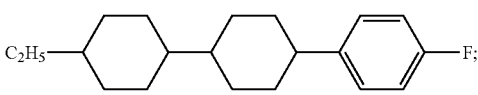

V-1-3
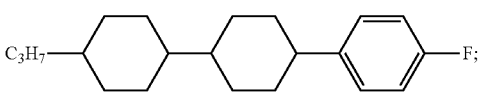

V-1-4
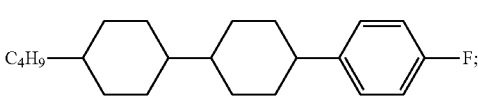

V-1-5
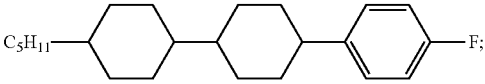

V-1-6
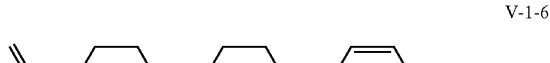

V-1-7
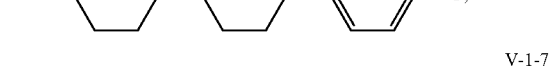

and

V-1-8
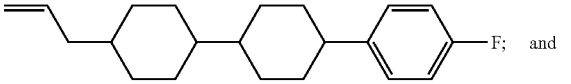

In some embodiments of the present invention, preferably, the compound of general formula V-2 is selected from a group consisting of the following compounds:

V-2-1
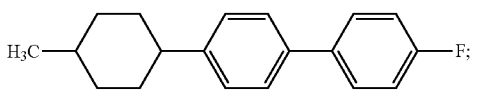

V-2-2
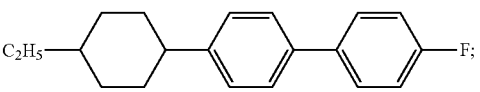

V-2-3
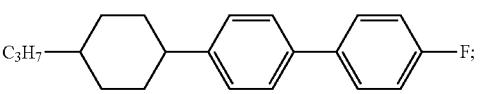

V-2-4
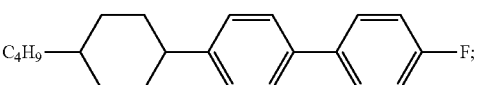

V-2-5
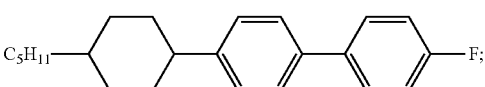

V-2-6
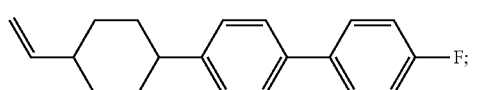

V-2-7
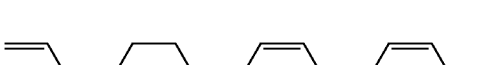

and

V-2-8
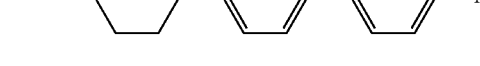

In some embodiments of the present invention, preferably, the compound of general formula V-3 is selected from a group consisting of the following compounds:

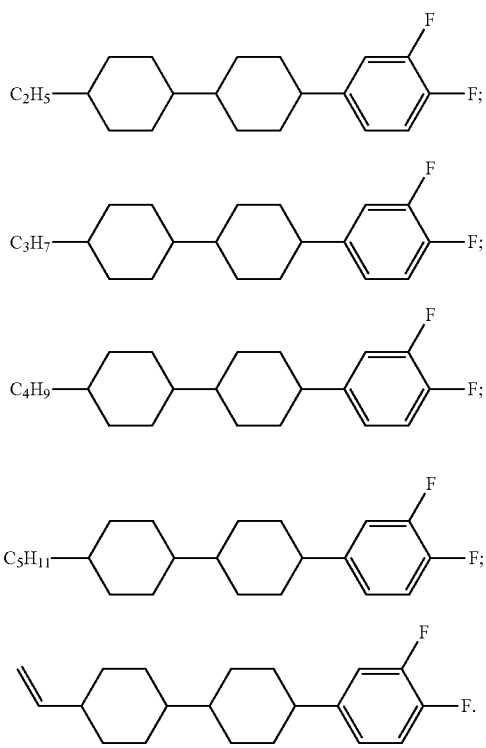

In some embodiments of the present invention, preferably, the compound of general formula V-4 is selected from a group consisting of the following compounds:

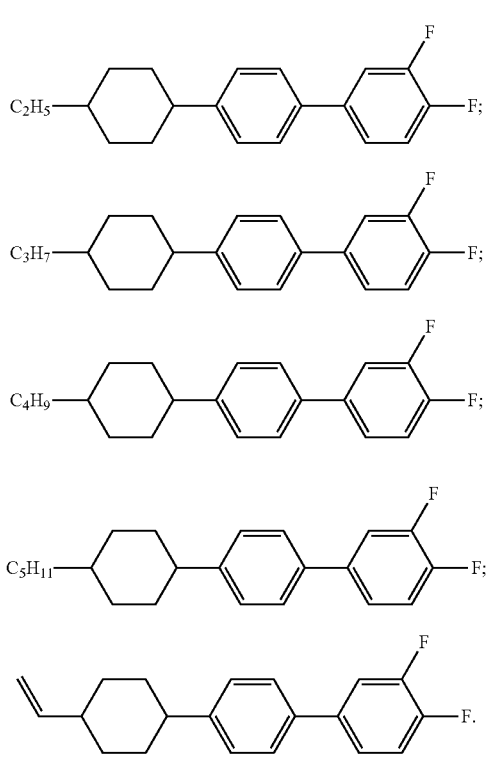

In some embodiments of the present invention, preferably, the compound of general formula V-5 is selected from a group consisting of the following compounds:

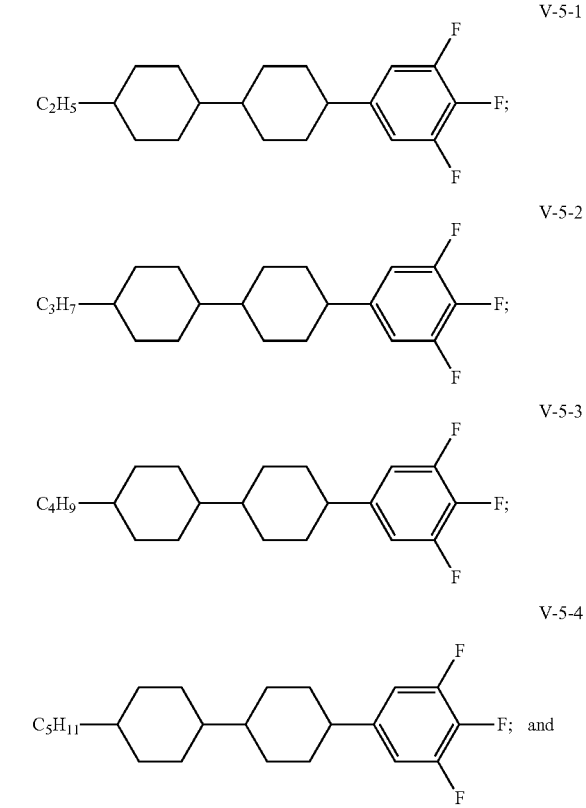

In some embodiments of the present invention, preferably, the compound of general formula V-6 is selected from a group consisting of the following compounds:

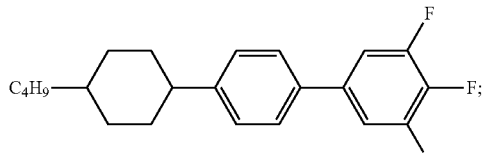
V-6-3

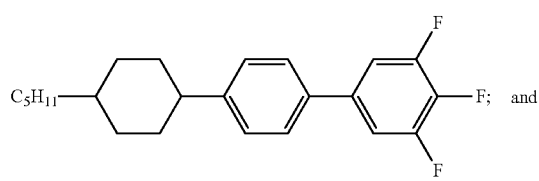
V-6-4

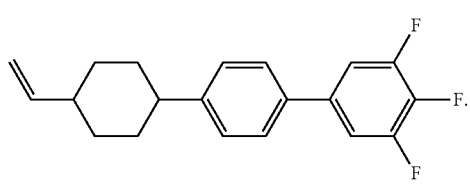
V-6-5

In some embodiments of the present invention, preferably, the compound of general formula V-7 is selected from a group consisting of the following compounds:

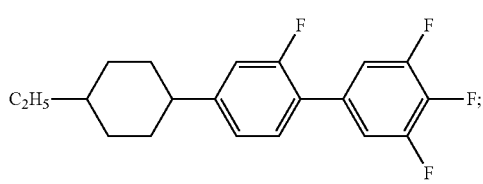
V-7-1

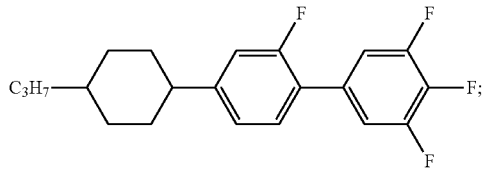
V-7-2

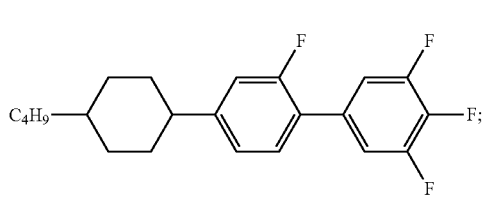
V-7-3

V-7-4

V-7-5

In some embodiments of the present invention, preferably, the compound of general formula V-8 is selected from a group consisting of the following compounds:

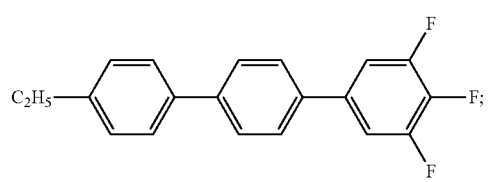
V-8-1

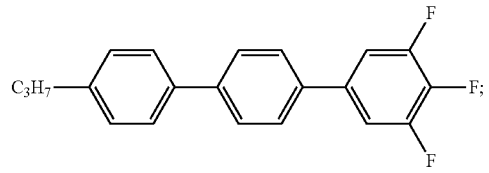
V-8-2

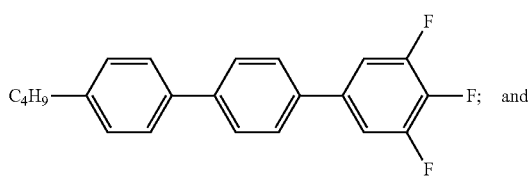
V-8-3

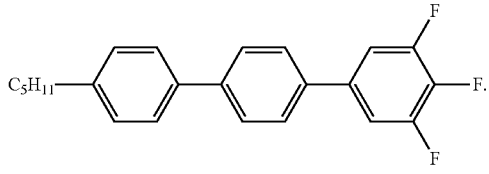
V-8-4

In some embodiments of the present invention, preferably, the compound of general formula V-9 is selected from a group consisting of the following compounds:

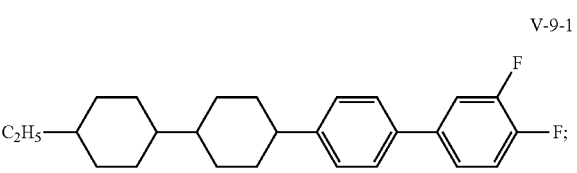
V-9-1

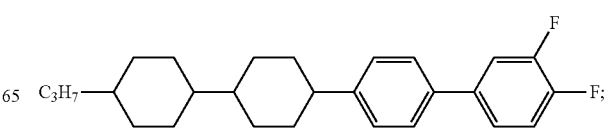
V-9-2

V-9-3
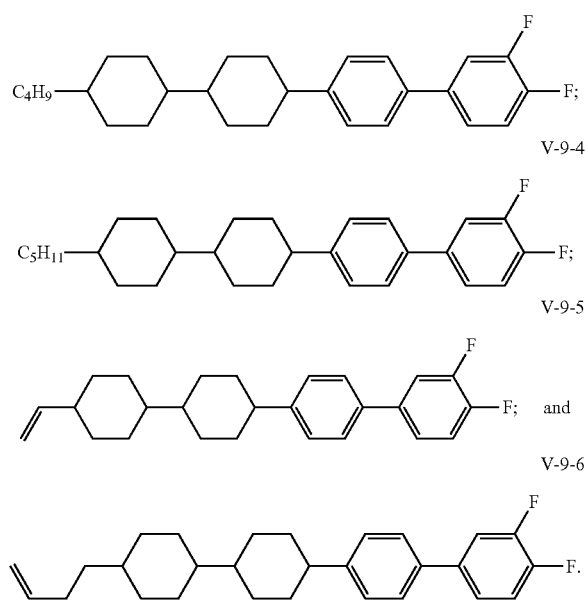
V-9-4
V-9-5
V-9-6
In some embodiments of the present invention, preferably, the compound of general formula V-10 is selected from a group consisting of the following compounds:
V-10-1
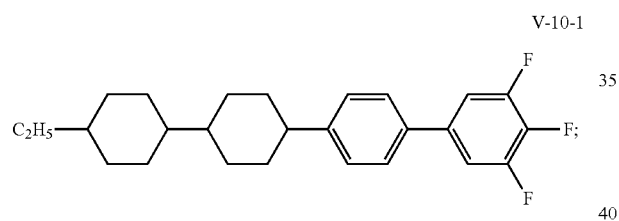
V-10-2
V-10-3
V-10-4
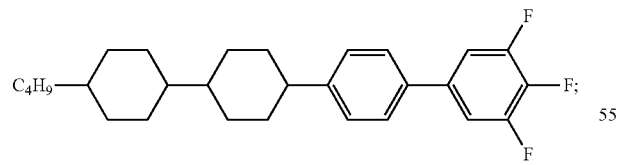
V-10-5
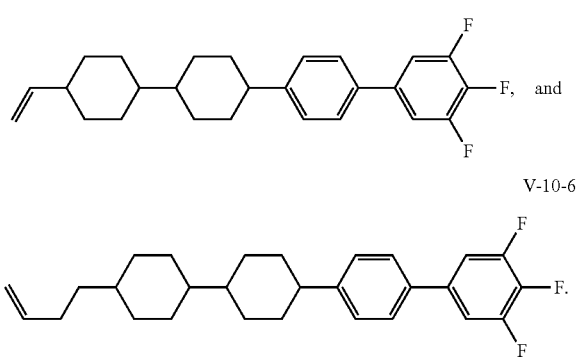
V-10-6
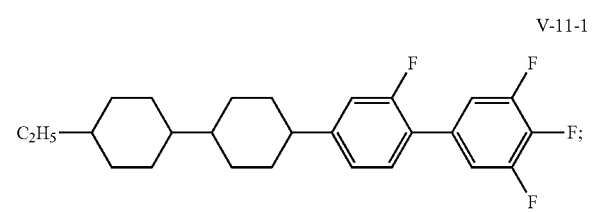
In some embodiments of the present invention, preferably, the compound of general formula V-11 is selected from a group consisting of the following compounds:
V-11-1
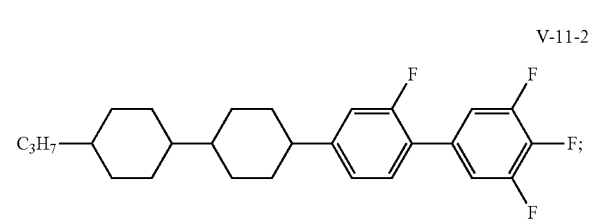
V-11-2
V-11-3
V-11-4
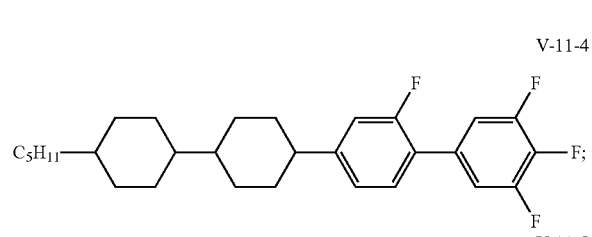
V-11-5
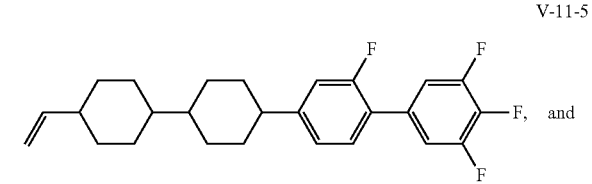

V-11-6

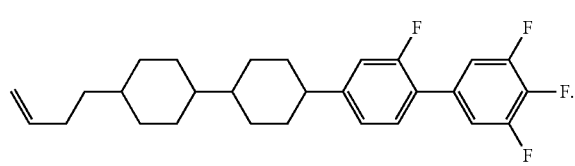

In some embodiments of the present invention, preferably, the compound of general formula V-12 is selected from a group consisting of the following compounds:

V-12-1

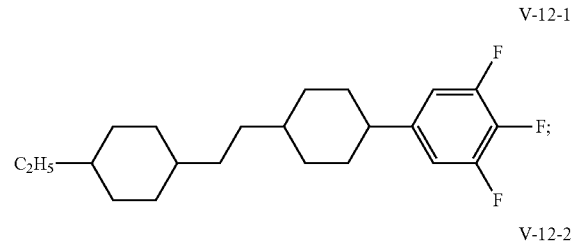

V-12-2

V-12-3

V-12-4

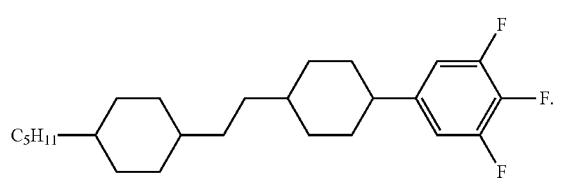

In some embodiments of the present invention, preferably, the compound of general formula V-13 is selected from a group consisting of the following compounds:

V-13-1

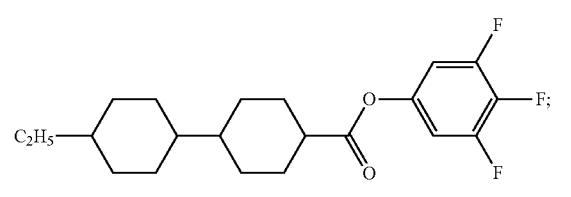

V-13-2

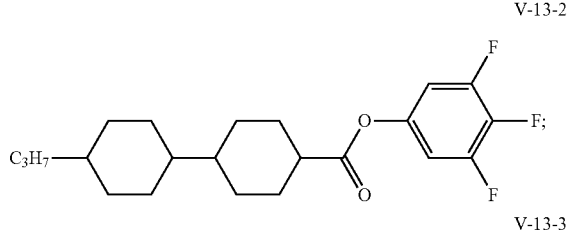

V-13-3

V-13-4

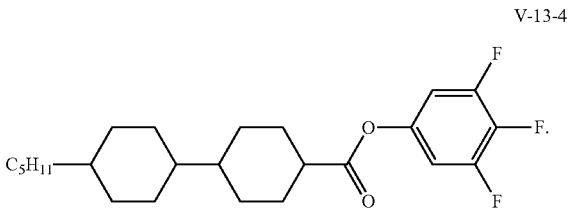

In some embodiments of the present invention, preferably, the compound of general formula VI is selected from a group consisting of the following compounds:

VI-1

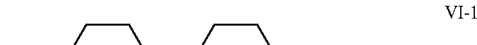

VI-2

VI-3

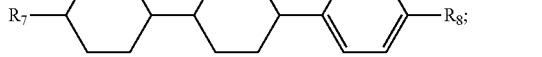

VI-4

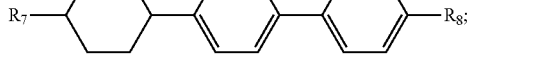

VI-5

VI-6

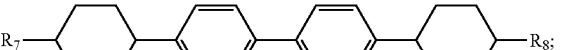

VI-7

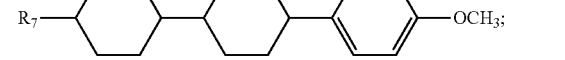

VI-8

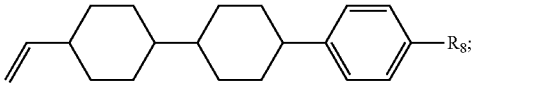

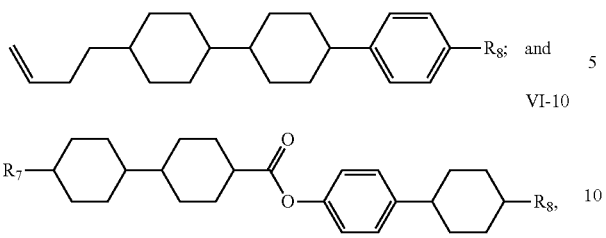

VI-9

VI-10 in which,

R₇ and R₈ are same or different, and each independently represents $C_1$-$C_5$ alkyl, $C_1$-$C_5$ alkoxy, $C_2$-$C_5$ alkenyl or $C_2$-$C_5$ alkenoxy.

In some embodiments of the present invention, preferably, the compound of general formula VI-1 comprises 3-47% by weight of the total amount of the liquid crystal composition; as a preferred technical solution, the compound of general formula VI-1 comprises 6-37% by weight of the total amount of the liquid crystal composition.

In some embodiments of the present invention, preferably, the compound of general formula VI-4 comprises 0-10% by weight of the total amount of the liquid crystal composition; as a preferred technical solution, the compound of general formula VI-4 comprises 1-5% by weight of the total amount of the liquid crystal composition.

In some embodiments of the present invention, preferably, the compound of general formula VI-7 comprises 0-10% by weight of the total amount of the liquid crystal composition; as a preferred technical solution, the compound of general formula VI-7 comprises 5-10% by weight of the total amount of the liquid crystal composition.

In some embodiments of the present invention, preferably, the compound of general formula VI-1 is selected from a group consisting of the following compounds:

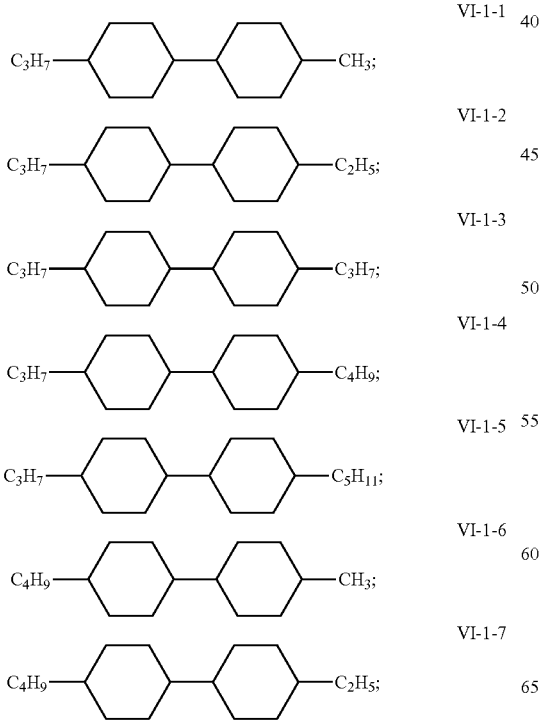

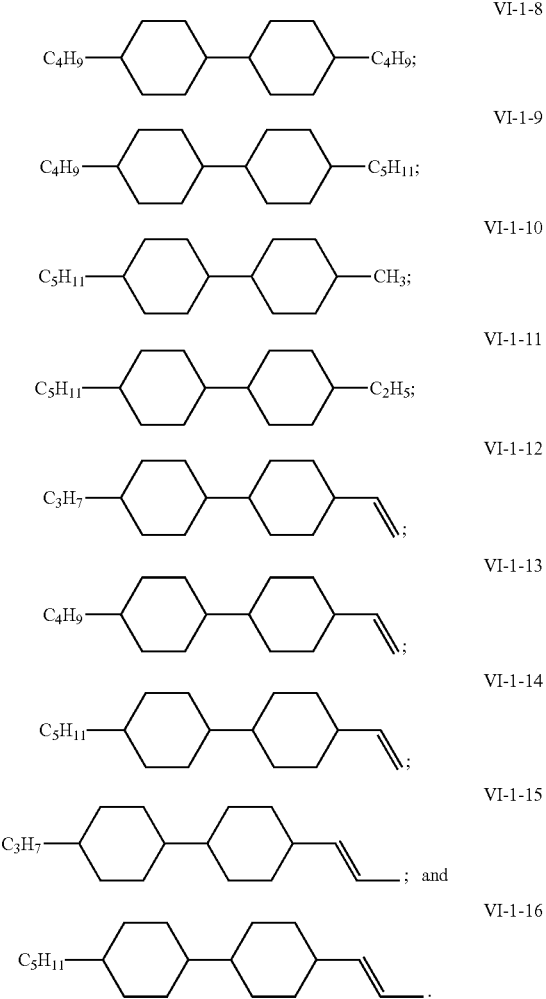

In some embodiments of the present invention, preferably, the compound of general formula VI-2 is selected from a group consisting of the following compounds:

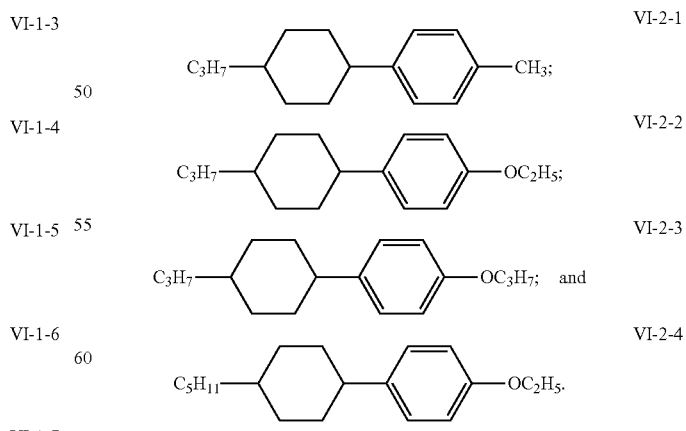

In some embodiments of the present invention, preferably, the compound of general formula VI-3 is selected from a group consisting of the following compounds:

VI-3-1
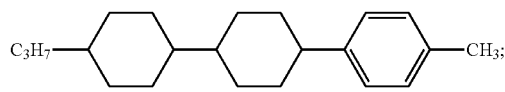
VI-3-2
VI-3-3
VI-3-4
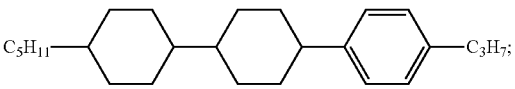
VI-3-5
VI-3-6
VI-3-7
VI-3-8
VI-3-9
VI-3-10
VI-3-11
VI-3-12
VI-3-13
VI-3-14
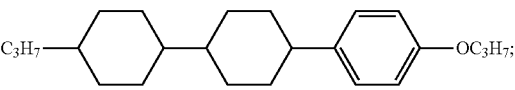
-continued
VI-3-14
VI-3-15
In some embodiments of the present invention, preferably, the compound of general formula VI-4 is selected from a group consisting of the following compounds:
VI-4-1
VI-4-2
VI-4-3
VI-4-4
VI-4-5
VI-4-6
VI-4-7
VI-4-8
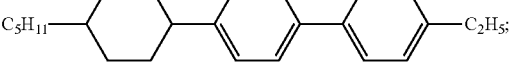
VI-4-9
VI-4-10

VI-4-11
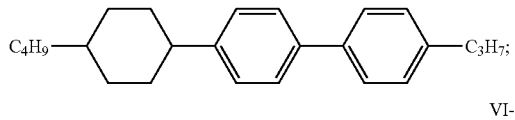

VI-4-12
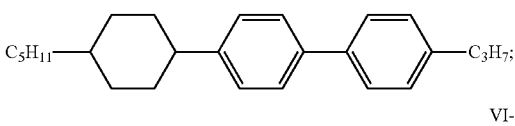

VI-4-13
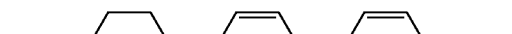

VI-4-14
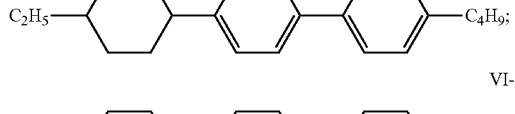

VI-4-15
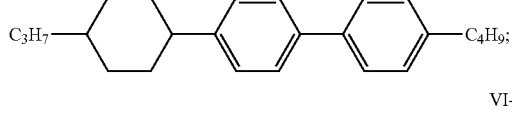 and

VI-4-16
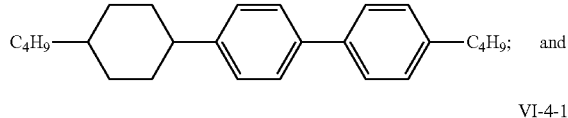

In some embodiments of the present invention, preferably, the compound of general formula VI-5 is selected from a group consisting of the following compounds:

VI-5-1
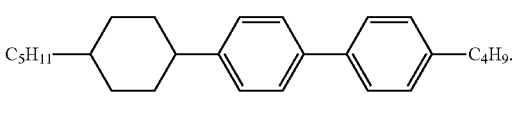

VI-5-2

VI-5-3

VI-5-4

VI-5-5
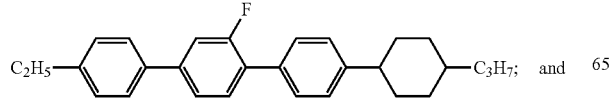 and

VI-5-6
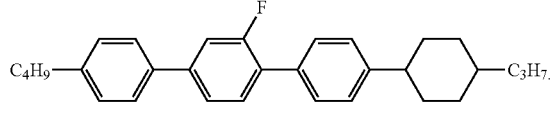

In some embodiments of the present invention, preferably, the compound of general formula VI-6 is selected from a group consisting of the following compounds:

VI-6-1
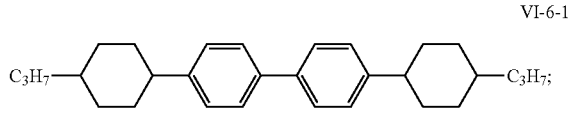

VI-6-2
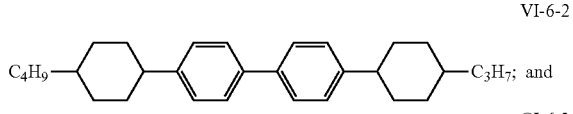 and

CI-6-3
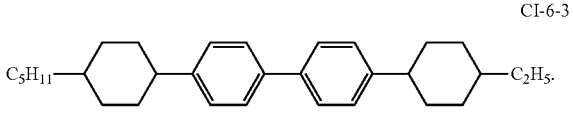

In some embodiments of the present invention, preferably, the compound of general formula VI-7 is selected from a group consisting of the following compounds:

VI-7-1
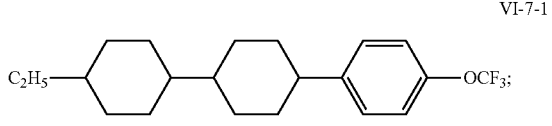

VI-7-2
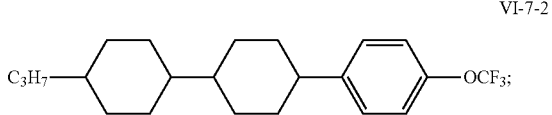

VI-7-3
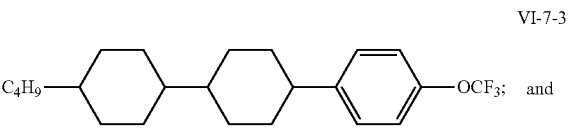 and

VI-7-4

In some embodiments of the present invention, preferably, the compound of general formula VI-8 is selected from a group consisting of the following compounds:

VI-8-1
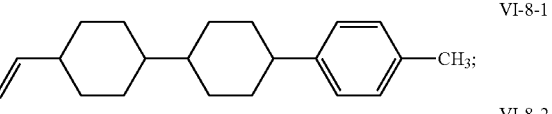

VI-8-2
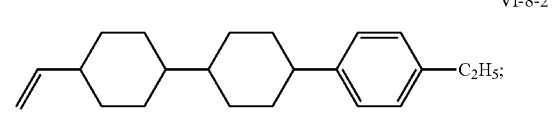

-continued

VI-8-3
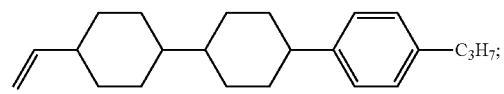

VI-8-4

VI-8-5
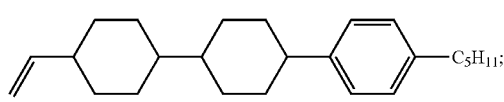

VI-8-6
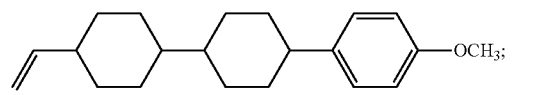
and

VI-8-7
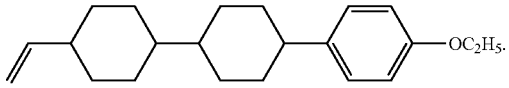

In some embodiments of the present invention, preferably, the compound of general formula VI-9 is selected from a group consisting of the following compounds:

VI-9-1
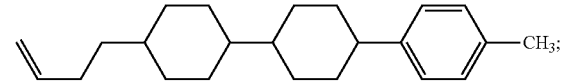

VI-9-2
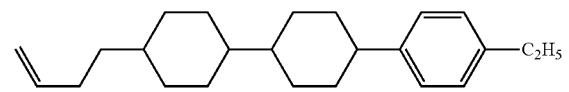

VI-9-3
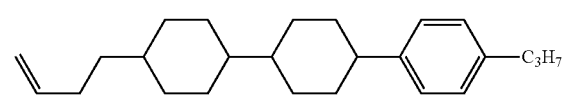

VI-9-4
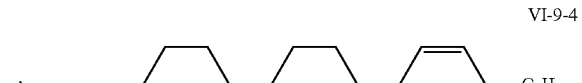

VI-9-5
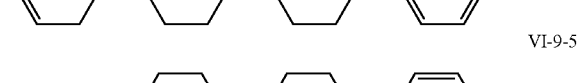

VI-9-6
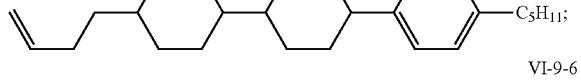
and

VI-9-7
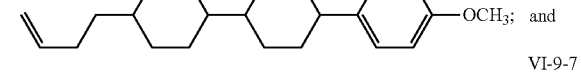

In some embodiments of the present invention, preferably, the compound of general formula VI-10 is selected from a group consisting of the following compounds:

VI-10-1
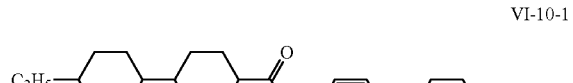

VI-10-2
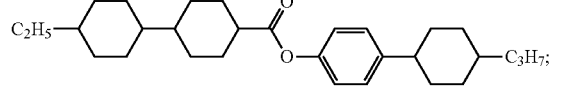

VI-10-3
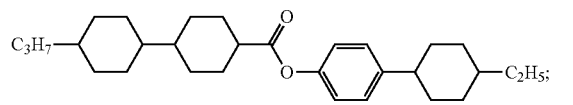

VI-10-4
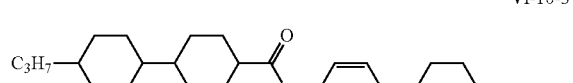
and

VI-10-5
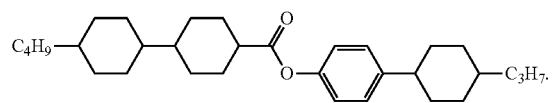

Another aspect of the present invention is to provide a liquid crystal display device comprising the liquid crystal composition of the present invention.

The inventors have found that the liquid crystal composition of the present invention has a lower viscosity. Since an AM display device is in pursuit of a fast response and the liquid crystal composition with a lower viscosity has a faster response speed, it is thus make it possible that the AM display device comprising the liquid crystal composition also has a faster response speed. Meanwhile, it is required that an AM device should have a low threshold voltage and a low power consumption. The liquid crystal composition of the present invention meets the developmental requirement for low power consumption of an AM device as it has a larger dielectric anisotropy and a lower driving voltage. Furthermore, an AM device has high requirements for the quality of liquid crystals and monomers in the liquid crystal composition, such as, the structure of the monomer molecules cannot decompose at high temperature, UV and other severe conditions, as well as the liquid crystal composition cannot decline in quality at high temperature and UV. The liquid crystal composition of the present invention uses monomers having a stable structure and optimal quality, so that the liquid crystal composition has a higher voltage holding ratio, and thereby it can reduce the risk of the residual image occurrences of the liquid crystal display device comprising the liquid crystal composition and can prolong the service life of the liquid crystal display device.

Unless specifically indicated, in the present invention, all ratios are weight ratios; all temperatures are degree centigrade; and the test on the data of the response time uses a cell gap of 7 μm.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the unit structures of the liquid crystal compounds in the following Examples are represented by the codes listed in Table 1:

TABLE 1

The codes of the unit structures of the liquid crystal compounds

| Unit structure | Code | Name of the group |
|---|---|---|
| (1,4-cyclohexylidene structure) | C | 1,4-cyclohexylidene |
| (1,4-phenylene structure) | P | 1,4-phenylene |
| (2-fluoro-1,4-phenylene structure) | G | 2-fluoro-1,4-phenylene |
| (2,5-difluoro-1,4-phenylene structure) | U | 2,5-difluoro-1,4-phenylene |
| (oxanyl structure) | A | oxanyl |
| (dioxanyl structure) | D | dioxanyl |
| (cyclopentyl structure) | C(5) | cyclopentyl |
| (indane-2,5-diyl structure) | I | indane-2,5-diyl |
| —COO— | E | ester group |
| —CF$_3$ | —CF3 | trifluoromethoxy |
| —F | F | fluorine |
| —CF$_2$O— | Q | difluoro-substituted ether group |
| —O— | O | oxygen |
| —C$_n$H$_{2n+1}$ or —C$_m$H$_{2m+1}$ | n or m | alkyl |
| —CH=CH— | V | ethenyl |
| —CH$_2$CH$_2$— | 2 | ethane bridge bond |

Take the following structural formula as an example:

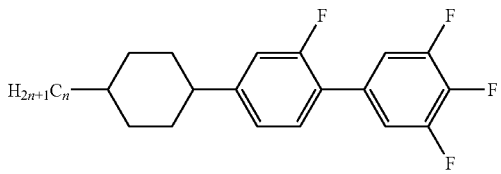

Represented by the codes listed in Table 1, this structural formula can be expressed as nCGUF, in which, the n in the code represents the number of the carbon atoms of the alkyl group on the left, for example, n is "2", meaning that the alkyl is —C$_2$H$_5$; the C in the code represents "cyclohexyl", the G in the code represents "2-fluoro-1,4-phenylene", the U in the code represents "2,5-difluoro-1,4-phenylene", the F in the code represents "fluorine".

The abbreviated codes of the test items in the following Examples are respectively represented as:

Δn: optical anisotropy (589 nm, 20° C.)

Δε: dielectric anisotropy (1 KHz, 25° C.)

Cp: clearing point (nematic-isotropy phase transition temperature, ° C.)

Vth threshold voltage (1 KHz, 25° C., TN90)

η flow viscosity (mm$^2$·s$^{-1}$, 20° C., except as otherwise noted)

VHR (initial) initial voltage holding ratio (%)

in which, the optical anisotropy is tested and obtained by using abbe refractometer under sodium lamp (589 nm) light source at 25° C.; the dielectric test cell was the type TN90, and the cell gap was 7 μm.

VHR (initial) is tested and obtained by the TOY06254 type liquid crystal physical property evaluation system: impulse voltage: 5V 6 HZ, test temperature is 60° C. and the test unit period is 166.7 ms.

Test conditions of Vth: C/1 KHZ, JTSB7.0.

The ingredients used in the following Examples can be synthesized by well-known methods or obtained by commercial means. These synthetic techniques are routine, and the test results show that the liquid crystal compounds thus prepared meet the criteria for the electronic compounds.

Several liquid crystal compositions are prepared according to the formulations of the liquid crystal compositions specified in the following Examples. The preparation of the liquid crystal compositions is proceeded according to the conventional methods in the art, and as an example, the compositions are prepared by mixing the specified formulation via the processing modes, such as heating, ultrasonic processing, suspending processing and so on.

The liquid crystal composition specified in the following Examples are prepared and studied. The formulas of the liquid crystal compositions and their test results for the performance are shown below.

Comparative Example 1

The liquid crystal composition of the Comparative Example 1 is prepared according to each compound and weight percentage listed in Table 2, and is tested by filling the same between two substrates of a liquid crystal display device. The test data are shown in the Table below:

TABLE 2

The formulation of the liquid crystal composition and its test performance

| Codes of the components | Codes of the structures | Content percentage | Test results for the performance parameters | |
|---|---|---|---|---|
| 3C2CUF | V-12-2 | 5 | Δn | 0.093 |
| 4C2CUF | V-12-3 | 5 | Δε | 7.1 |
| 3CCEPC4 | VI-10-4 | 4 | Cp | 98 |
| 2CGUF | V-7-1 | 10 | Vth | 1.88 |
| 2DPUF | I-1 | 6 | η | 16 |
| 3DPUF | I-2 | 8 | VHR (initial) | 94.5 |
| 5CCUF | V-5-4 | 6 | | |
| 3CCPUF | V-10-2 | 4 | | |
| 2CCPUF | V-10-1 | 4 | | |
| 4CCPUF | V-10-3 | 4 | | |
| 2CCPOCF3 | VI-7-1 | 6 | | |
| 3CCPOCF3 | VI-7-2 | 5 | | |
| VCCGF | V-3-5 | 6 | | |
| VCCP1 | VI-8-1 | 6 | | |
| 3CCV | VI-1-12 | 21 | | |
| Total | | 100 | | |

Comparative Example 2

The liquid crystal composition of the Comparative Example 2 is prepared according to each compound and weight percentage listed in Table 3, and is tested by filling the same between two substrates of a liquid crystal display device. The test data are shown in the Table below:

TABLE 3

The formulation of the liquid crystal composition and its test performance

| Codes of the components | Codes of the structures | Content percentage | Test results for the performance parameters | |
|---|---|---|---|---|
| 2CCPUF | V-10-1 | 2 | Δn | 0.113 |
| 3CCPUF | V-10-2 | 2 | Δε | 5.1 |
| 4CCPUF | V-10-3 | 2 | Cp | 82 |
| 3CCGUF | V-11-2 | 2.5 | Vth | 2.43 |
| 3PGP4 | | 5 | η | 10.9 |
| 2PGP3 | | 11 | | |
| 2PGUF | | 6 | | |
| 3PGUF | | 4.5 | | |
| 3CCV | VI-1-12 | 57 | | |
| 3PGUQPOCF3 | II-2-3 | 8 | | |
| Total | | 100 | | |

Comparative Example 3

The liquid crystal composition of the Comparative Example 3 is prepared according to each compound and weight percentage listed in Table 4, and is tested by filling the same between two substrates of a liquid crystal display device. The test data are shown in the Table below:

TABLE 4

The formulation of the liquid crystal composition and its test performance

| Codes of the components | Codes of the structures | Content percentage | Test results for the performance parameters | |
|---|---|---|---|---|
| 3CPUF | V-6-2 | 24 | Δn | 0.1 |
| 5CPUF | V-6-4 | 6 | Δε | 6.6 |
| 2CCUF | V-5-1 | 8 | Cp | 90 |
| 3CCUF | V-5-2 | 10 | Vth | 1.88 |
| 3CCPUF | V-10-2 | 6 | η | 12 |
| 2CCPUF | V-10-1 | 5 | | |
| 4CCPUF | V-10-3 | 4 | | |
| 3CCGUF | V-11-2 | 4 | | |
| VCCP1 | VI-8-1 | 2 | | |
| 3CCV | VI-1-12 | 25 | | |
| 3CCV1 | VI-1-15 | 6 | | |
| Total | | 100 | | |

Example 1

The liquid crystal composition of Example 1 is prepared according to each compound and weight percentage listed in Table 5, and is tested by filling the same between two substrates of a liquid crystal display device. The test data are shown in the Table below:

TABLE 5

The formulation of the liquid crystal composition and its test performance

| Codes of the components | Codes of the structures | Content percentage | Test results for the performance parameters | |
|---|---|---|---|---|
| 3DPUF | I-2 | 3 | Δn | 0.108 |
| 4DPUF | I-3 | 5 | Δε | 12.9 |
| 5DPUF | I-4 | 3 | Cp | 101 |
| 3PGUQPCF3 | II-1-3 | 5 | Vth | 1.59 |
| 4PGUQPCF3 | II-1-4 | 6 | η | 17.2 |
| 2PGUQPOCF3 | II-2-2 | 6 | VHR (initial) | 97.8 |
| 3IUQUF | IV-9-2 | 3 | | |
| 3PGUQUF | IV-8-2 | 3 | | |
| 4PGUQUF | IV-8-3 | 5 | | |
| 5PGUQUF | IV-8-4 | 6 | | |
| 3CPUF | V-6-2 | 4 | | |
| 5CPUF | V-6-4 | 6 | | |
| 3CPP2 | VI-4-6 | 2 | | |
| 3CCV | VI-1-12 | 27 | | |
| 3CCV1 | VI-1-15 | 10 | | |
| 5PP1 | III-5 | 6 | | |
| Total | | 100 | | |

Example 2

The liquid crystal composition of Example 2 is prepared according to each compound and weight percentage listed in Table 6, and is tested by filling the same between two substrates of a liquid crystal display device. The test data are shown in the Table below:

TABLE 6

The formulation of the liquid crystal composition and its test performance

| Codes of the components | Codes of the structures | Content percentage | Test results for the performance parameters | |
|---|---|---|---|---|
| 4DPUF | I-3 | 4 | Δn | 0.116 |
| 5DPUF | I-4 | 4 | Δε | 14.5 |

TABLE 6-continued

The formulation of the liquid crystal composition and its test performance

| Codes of the components | Codes of the structures | Content percentage | Test results for the performance parameters | |
|---|---|---|---|---|
| 3PGUQPCF3 | II-1-3 | 3 | Cp | 92 |
| 4PGUQPCF3 | II-1-4 | 6 | Vth | 1.39 |
| 5PGUQPCF3 | II-1-5 | 5 | η | 28 |
| 2CCQUF | IV-1-1 | 9 | VHR (initial) | 97.3 |
| 3CCQUF | IV-1-2 | 12 | | |
| 3PUQUF | IV-5-2 | 20 | | |
| 3CPUF | V-6-2 | 11 | | |
| 3CCUF | V-5-2 | 6 | | |
| 2CCPUF | V-10-1 | 3 | | |
| 3CCPUF | V-10-2 | 4 | | |
| 4CCPUF | V-10-3 | 3 | | |
| 3CCV | VI-1-12 | 3 | | |
| 5PP1 | III-5 | 7 | | |
| Total | | 100 | | |

Example 3

The liquid crystal composition of Example 3 is prepared according to each compound and weight percentage listed in Table 7, and is tested by filling the same between two substrates of a liquid crystal display device. The test data are shown in the Table below:

TABLE 7

The formulation of the liquid crystal composition and its test performance

| Codes of the components | Codes of the structures | Content percentage | Test results for the performance parameters | |
|---|---|---|---|---|
| 3DPUF | I-2 | 4 | Δn | 0.109 |
| 5DPUF | I-4 | 5 | Δε | 14.1 |
| 2PGUQPCF3 | II-1-2 | 6 | Cp | 101.3 |
| 3PGUQPCF3 | II-1-3 | 6 | Vth | 1.65 |
| 4PGUQPCF3 | II-1-4 | 6 | η | 20 |
| 2IUQUF | IV-9-1 | 6 | VHR (initial) | 97.2 |
| 3IUQUF | IV-9-2 | 5 | | |
| 2CCUF | V-5-1 | 5 | | |
| 3CCUF | V-5-2 | 6 | | |
| 2CCPUF | V-10-1 | 6 | | |
| 3CCPUF | V-10-2 | 10 | | |
| 4CCPUF | V-10-3 | 6 | | |
| 3CCPOCF3 | VI-7-2 | 8 | | |
| 3CCV | VI-1-12 | 18 | | |
| 5PP1 | III-5 | 3 | | |
| Total | | 100 | | |

Example 4

The liquid crystal composition of Example 4 is prepared according to each compound and weight percentage listed in Table 8, and is tested by filling the same between two substrates of a liquid crystal display device. The test data are shown in the Table below:

TABLE 8

The formulation of the liquid crystal composition and its test performance

| Codes of the components | Codes of the structures | Content percentage | Test results for the performance parameters | |
|---|---|---|---|---|
| 3DPUF | I-2 | 3 | Δn | 0.097 |
| 4DPUF | I-3 | 5 | Δε | 12.1 |
| 5DPUF | I-4 | 5 | Cp | 91 |
| 4PGUQPCF3 | II-1-4 | 6 | Vth | 1.59 |
| 2PGUQPOCF3 | II-2-2 | 5 | η | 18 |
| 3IUQUF | IV-9-2 | 2 | VHR (initial) | 97.8 |
| 3IGUQUF | IV-10-2 | 3 | | |
| 4IGUQUF | IV-10-3 | 5 | | |
| 5IGUQUF | IV-10-4 | 5 | | |
| 3CPUF | V-6-2 | 4 | | |
| 4CPUF | V-6-3 | 4 | | |
| 3CPP2 | VI-4-6 | 2 | | |
| 3CCV | VI-1-12 | 37 | | |
| 3CCV1 | VI-1-15 | 10 | | |
| 5PP1 | III-5 | 4 | | |
| Total | | 100 | | |

Example 5

The liquid crystal composition of Example 5 is prepared according to each compound and weight percentage listed in Table 9, and is tested by filling the same between two substrates of a liquid crystal display device. The test data are shown in the Table below:

TABLE 9

The formulation of the liquid crystal composition and its test performance

| Codes of the components | Codes of the structures | Content percentage | Test results for the performance parameters | |
|---|---|---|---|---|
| 4DPUF | I-3 | 3 | Δn | 0.111 |
| 5DPUF | I-4 | 3 | Δε | 14.5 |
| 4PGUQPCF3 | II-1-4 | 6 | Cp | 96 |
| 2PGUQPOCF3 | II-2-2 | 5 | Vth | 1.63 |
| 2CCQUF | IV-1-1 | 12 | η | 21 |
| 3CCQUF | IV-1-2 | 12 | VHR (initial) | 97.3 |
| 3PUQUF | IV-5-2 | 14 | | |
| (C5)PUQUF | IV-6-1 | 6 | | |
| 3CPUF | V-6-2 | 5 | | |
| 3CGUF | V-7-2 | 6 | | |
| 3CCUF | V-5-2 | 7 | | |
| 2CCPUF | V-10-1 | 3 | | |
| 3CCPUF | V-10-2 | 4 | | |
| 4CCPUF | V-10-3 | 3 | | |
| 3CCV | VI-1-12 | 6 | | |
| 5PP1 | III-5 | 5 | | |
| Total | | 100 | | |

Example 6

The liquid crystal composition of Example 6 is prepared according to each compound and weight percentage listed in Table 10, and is tested by filling the same between two substrates of a liquid crystal display device. The test data are shown in the Table below:

TABLE 10

The formulation of the liquid crystal composition and its test performance

| Codes of the components | Codes of the structures | Content percentage | Test results for the performance parameters | |
|---|---|---|---|---|
| 3DPUF | I-2 | 3 | Δn | 0.108 |
| 5DPUF | I-4 | 3 | Δε | 13.1 |
| 3PGUQPCF3 | II-1-3 | 5 | Cp | 105 |
| 4PGUQPCF3 | II-1-4 | 6 | Vth | 1.58 |
| 2PGUQPOCF3 | II-2-2 | 6 | η | 17.2 |
| 3IUQUF | IV-9-2 | 3 | VHR (initial) | 97.8 |
| 3PGUQUF | IV-8-2 | 3 | | |
| 4PGUQUF | IV-8-3 | 5 | | |
| 5PGUQUF | IV-8-4 | 6 | | |
| 3CCGF | V-3-2 | 5 | | |
| 3CPGF | V-4-2 | 5 | | |
| 3CPUF | V-6-2 | 4 | | |
| 5CPUF | V-6-4 | 6 | | |
| 3CPP2 | VI-4-6 | 2 | | |
| 3CCV | VI-1-12 | 25 | | |
| 3CCV1 | VI-1-15 | 10 | | |
| 3PP3 | III-8 | 3 | | |
| Total | | 100 | | |

Example 7

The liquid crystal composition of Example 7 is prepared according to each compound and weight percentage listed in Table 11, and is tested by filling the same between two substrates of a liquid crystal display device. The test data are shown in the Table below:

TABLE 11

The formulation of the liquid crystal composition and its test performance

| Codes of the components | Codes of the structures | Content percentage | Test results for the performance parameters | |
|---|---|---|---|---|
| 3DPUF | I-2 | 4 | Δn | 0.115 |
| 5DPUF | I-4 | 5 | Δε | 14.3 |
| 2PGUQPCF3 | II-1-2 | 6 | Cp | 101.3 |
| 3PGUQPCF3 | II-1-3 | 6 | Vth | 1.71 |
| 4PGUQPCF3 | II-1-4 | 6 | η | 21 |
| 2IUQUF | IV-9-1 | 6 | VHR (initial) | 97.4 |
| 3IUQUF | IV-9-2 | 5 | | |
| 2CCUF | V-5-1 | 5 | | |
| 3CCUF | V-5-2 | 5 | | |
| 2CCPUF | V-10-1 | 6 | | |
| 3CCPUF | V-10-2 | 10 | | |
| 4CCPUF | V-10-3 | 6 | | |
| 3CCV | VI-1-12 | 12 | | |
| 3CCPOCF3 | VI-7-2 | 8 | | |
| 4PP1 | III-4 | 10 | | |
| Total | | 100 | | |

Example 8

The liquid crystal composition of Example 8 is prepared according to each compound and weight percentage listed in Table 12, and is tested by filling the same between two substrates of a liquid crystal display device. The test data are shown in the Table below:

TABLE 12

The formulation of the liquid crystal composition and its test performance

| Codes of the components | Codes of the structures | Content percentage | Test results for the performance parameters | |
|---|---|---|---|---|
| 2DPUF | I-1 | 4 | Δn | 0.117 |
| 3DPUF | I-2 | 4 | Δε | 14.3 |
| 3PGUQPCF3 | II-1-3 | 3 | Cp | 92 |
| 4PGUQPCF3 | II-1-4 | 6 | Vth | 1.38 |
| 5PGUQPCF3 | II-1-5 | 5 | η | 29 |
| 2CCQUF | IV-1-1 | 9 | VHR (initial) | 97.8 |
| 3CCQUF | IV-1-2 | 12 | | |
| 3PUQUF | IV-5-2 | 20 | | |
| 3CPUF | V-6-2 | 11 | | |
| 3CCUF | V-5-2 | 6 | | |
| 2CCPUF | V-10-1 | 3 | | |
| 3CCPUF | V-10-2 | 4 | | |
| 4CCPUF | V-10-3 | 3 | | |
| 3CCV | VI-1-12 | 3 | | |
| 3PP2 | III-2 | 7 | | |
| Total | | 100 | | |

Referring to Comparative Examples 1, 2 and 3, it can be seen from the test data of the above Examples 1, 2, 3, 4, 5, 6, 7 and 8 that the liquid crystal composition provided by the present invention has a larger dielectric anisotropy, a larger optical anisotropy, and a lower threshold voltage, and is suitable for liquid crystal display devices. When being compared with Comparative Examples 1, 2 and 3, the liquid crystal composition provided by the present invention has a better optical anisotropy, dielectric anisotropy, and an appropriate clearing point applicable for most liquid crystal display devices, and therefore, can meet the requirements for a high contrast ration and a superior power saving performance for liquid crystal display devices.

What is claimed is:

1. A liquid crystal composition, comprising:

5-30% by weight of the total amount of the liquid crystal composition of a first component, said first component being one or more compounds of general formula I

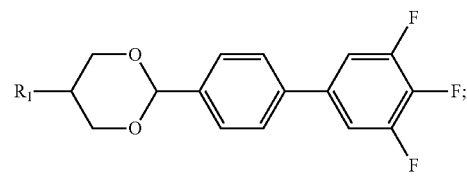

I 5-25% by weight of the total amount of the liquid crystal composition of a second component, said second component being one or more compounds of general formula II-1 and/or general formula II-2

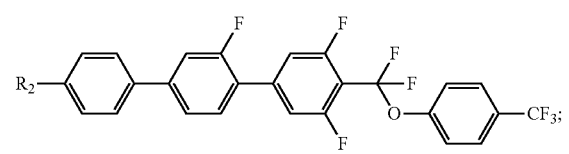

II-1

-continued

II-2

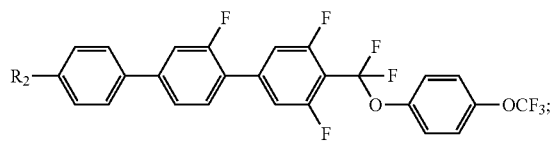

1-15% by weight of the total amount of the liquid crystal composition of a third component, said third component being one or more compounds of general formula III

III

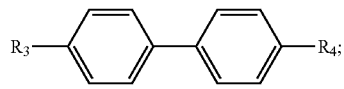

5-50% by weight of the total amount of the liquid crystal composition of a fourth component, said fourth component being one or more compounds of general formula IV

IV

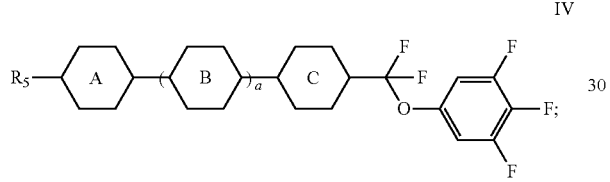

5-45% by weight of the total amount of the liquid crystal composition of a fifth component, said fifth component being one or more compounds of general formula V

V

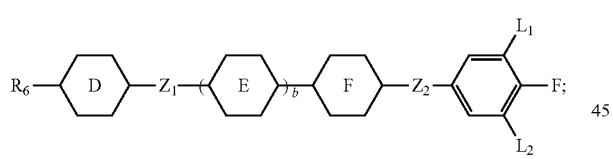

and 1-50% by weight of the total amount of the liquid crystal composition of a sixth component, said sixth component being one or more compounds of general formula VI

VI

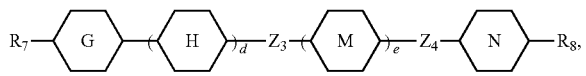

in which:

$R_1$, $R_2$, $R_3$, $R_4$, $R_6$, $R_7$ and $R_8$ are same or different, and each independently represents $C_1$-$C_7$ alkyl substituted by fluorine or unsubstituted by fluorine, $C_1$-$C_7$ alkoxy substituted by fluorine or unsubstituted by fluorine, or $C_2$-$C_7$ alkenyl substituted by fluorine or unsubstituted by fluorine;

$R_5$ represents —H, $C_1$-$C_7$ alkyl substituted by fluorine or unsubstituted by fluorine, $C_1$-$C_7$ alkoxy substituted by fluorine or unsubstituted by fluorine, or $C_2$-$C_7$ alkenyl substituted by fluorine or unsubstituted by fluorine;

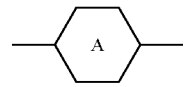

represents

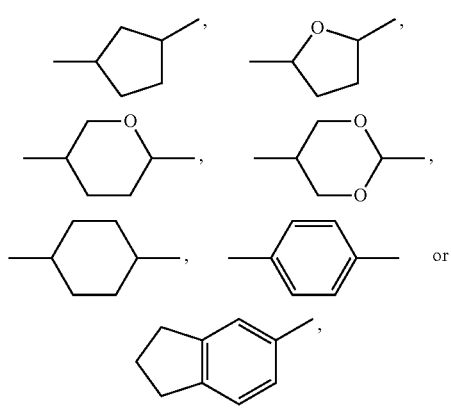

one or more H on the

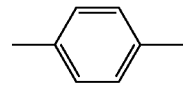

can be substituted by F;

Ring

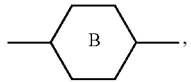

ring

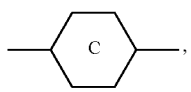

ring

ring

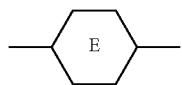

and ring

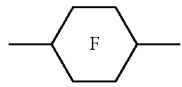

are same or different, and each independently represents

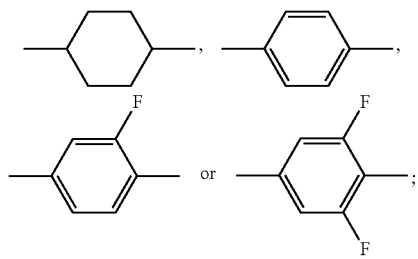

Ring

ring

ring

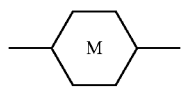

and ring

are same or different, and each independently represents

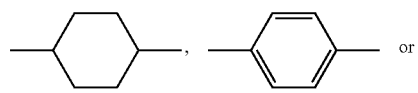

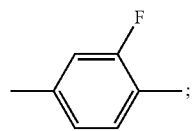

$L_1$ and $L_2$ are same or different, and each independently represents —H or —F;

$Z_1$ and $Z_2$ are same or different, and each independently represents single bond, —COO—, —CH$_2$CH$_2$— or —CH$_2$O—;

$Z_3$ and $Z_4$ are same or different, and each independently represents single bond, —COO— or —CH$_2$O—;

a represents 0, 1 or 2, and when a is 2, rings

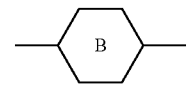

can be same or different;

b, d and e are same or different, and each independently represents 0 or 1;

in which, when d=e=0, d=1 and e=0 or d=0 and e=1, ring

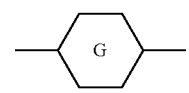

and ring

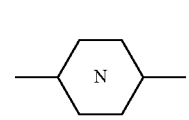

are not simultaneously

2. The liquid crystal composition according to claim 1, characterized in that the compound of general formula I is selected from a group consisting of the following compounds:

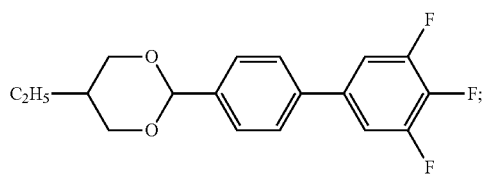

I-2
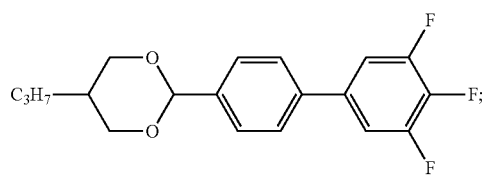

I-3
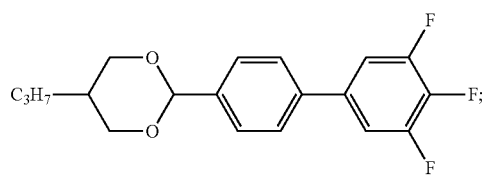 and

I-4

3. The liquid crystal composition according to claim 1, characterized in that the compound of general formula II-1 is selected from a group consisting of the following compounds:

II-1-1
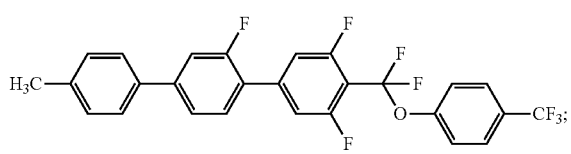

II-1-2

II-1-3
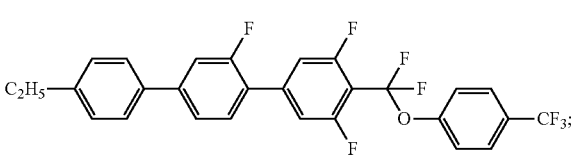

II-1-4

II-1-5
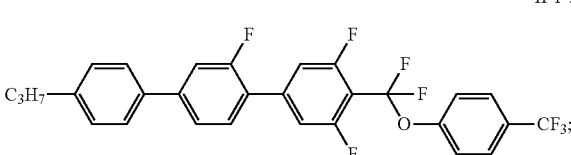

II-1-6
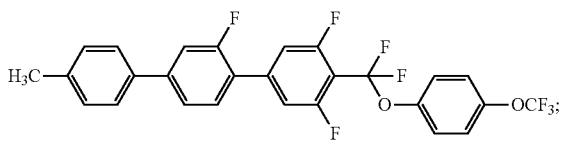

II-1-7
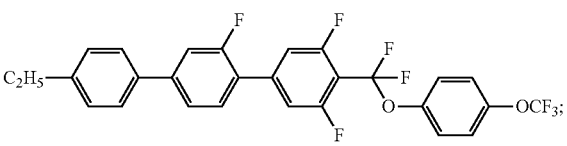 and

II-1-8

4. The liquid crystal composition according to claim 1, characterized in that the compound of general formula II-2 is selected from a group consisting of the following compounds:

II-2-1
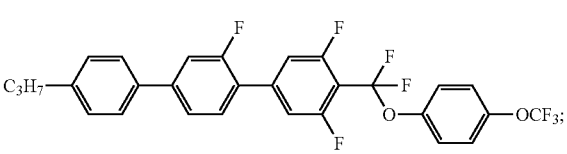

II-2-2

II-2-3
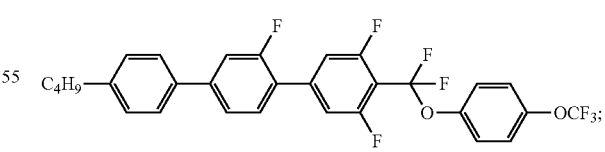

II-2-4

II-2-5
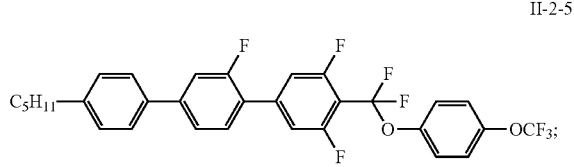

II-2-6
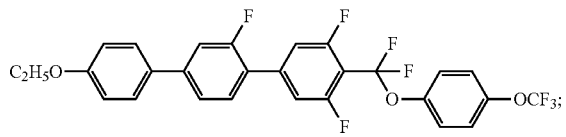

II-2-7
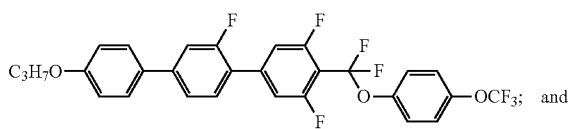
and

II-2-8
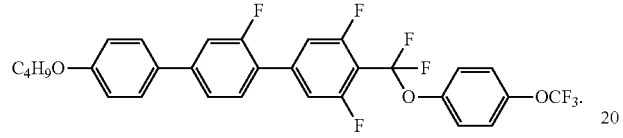

5. The liquid crystal composition according to claim 1, characterized in that the compound of general formula III is selected from a group consisting of the following compounds:

III-1
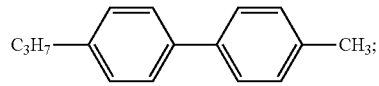

III-2
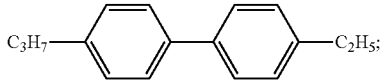

III-3
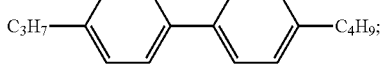

III-4
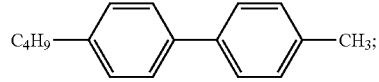

III-5
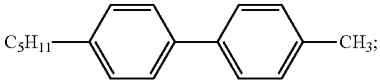

III-6
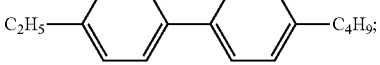

III-7
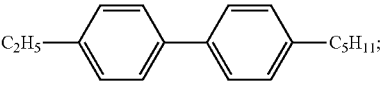

III-8
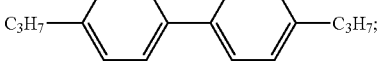

III-9
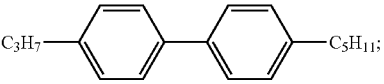

III-10
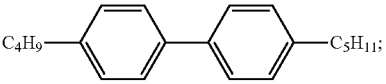

III-11
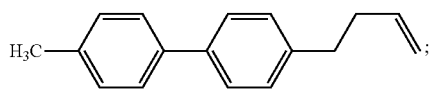

III-12
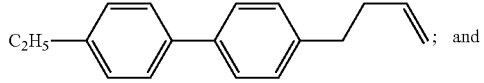
and

III-13
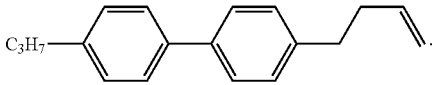

6. The liquid crystal composition according to claim 1, characterized in that the compound of general formula IV is selected from a group consisting of the following compounds:

IV-1
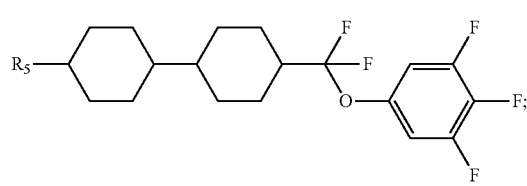

IV-2

IV-3
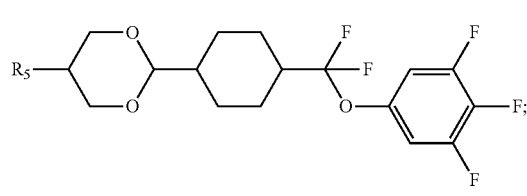

IV-4

-continued

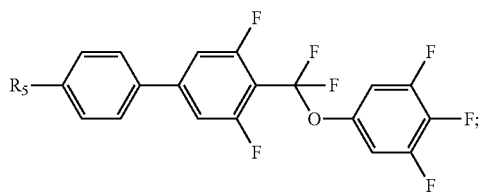
IV-5

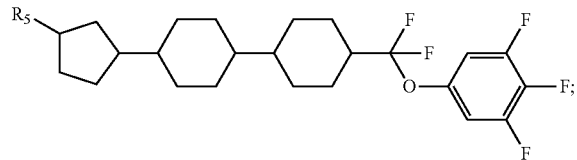
IV-6

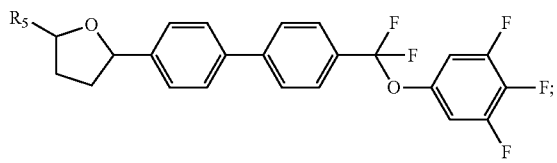
IV-7

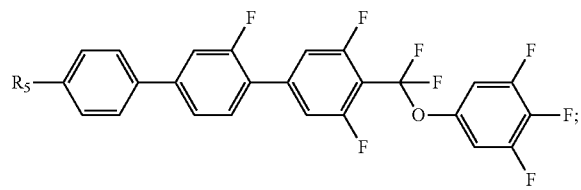
IV-8

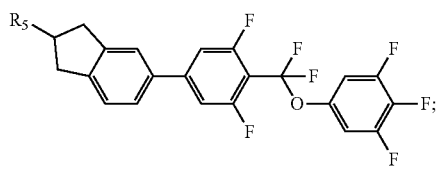
IV-9

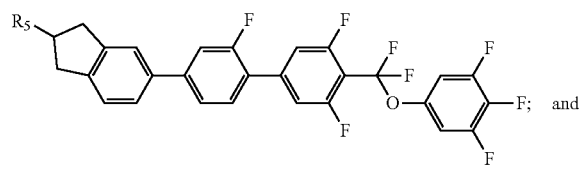
IV-10

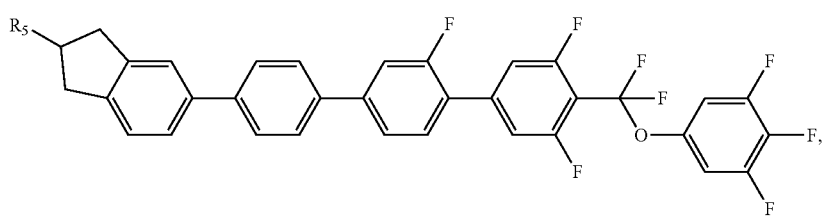
IV-11 in which, $R_5$ represents $C_1$-$C_7$ alkyl substituted by fluorine or unsubstituted by fluorine, C1-C7 alkoxy substituted by fluorine or unsubstituted by fluorine.

7. The liquid crystal composition according to claim 6, characterized in that the compound of general formula IV-1 is selected from a group consisting of the following compounds:

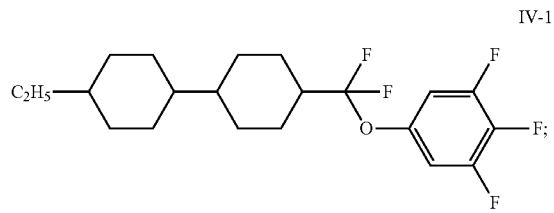
IV-1-1

-continued

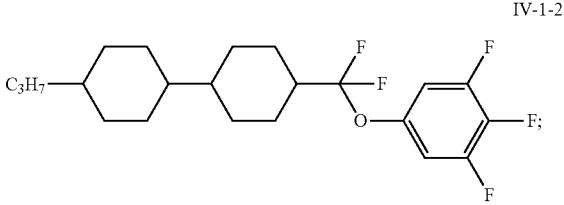
IV-1-2

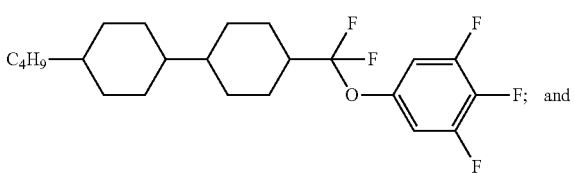
IV-1-3

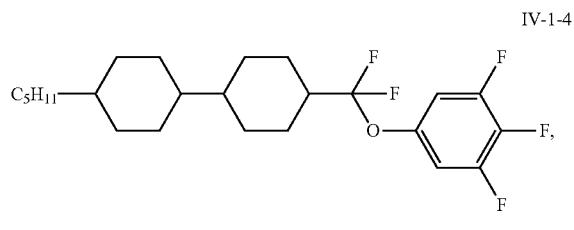
the compound of general formula IV-2 is selected from a group consisting of the following compounds:
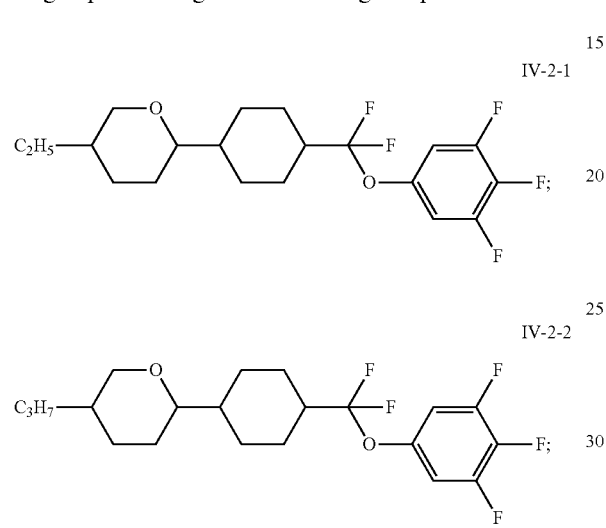
the compound of general formula IV-3 is selected from a group consisting of the following compounds:
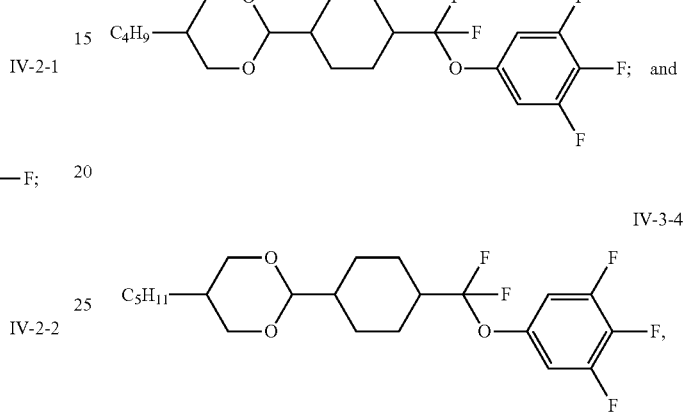
the compound of general formula IV-4 is selected from a group consisting of the following compounds:
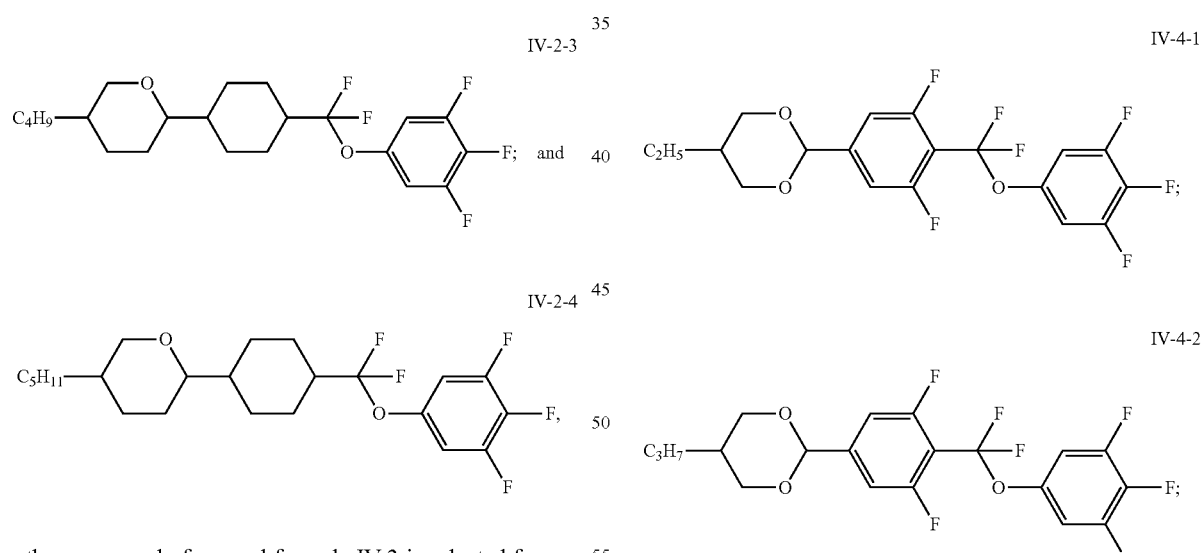
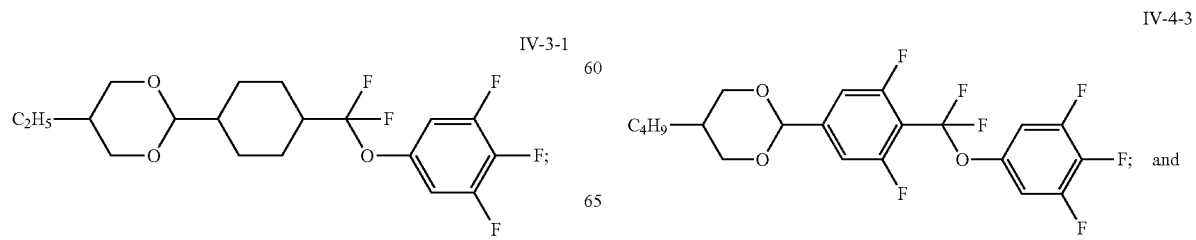

IV-4-4
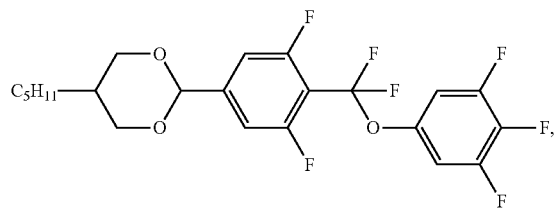
the compound of general formula IV-5 is selected from a group consisting of the following compounds:
IV-5-1
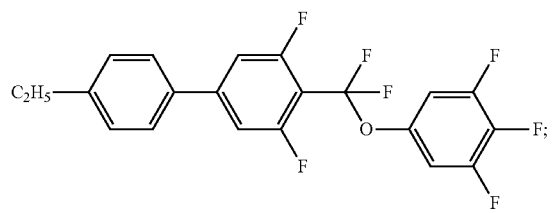
IV-5-2
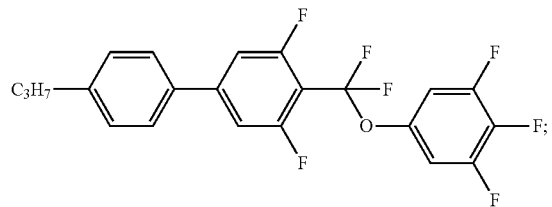
IV-5-3
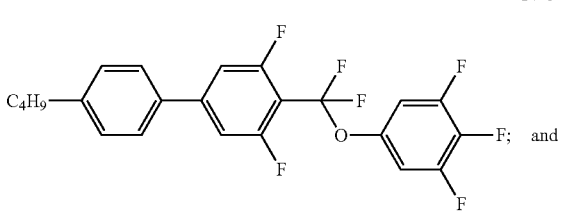
IV-5-4
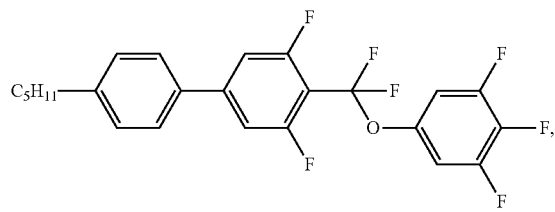
the compound of general formula IV-6 is selected from a group consisting of the following compounds:
IV-6-1
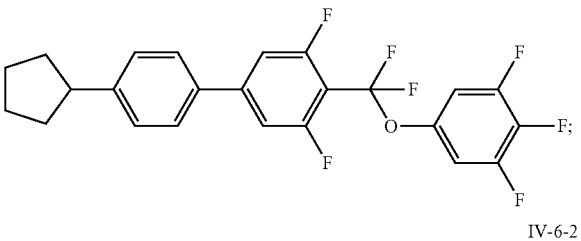
IV-6-2
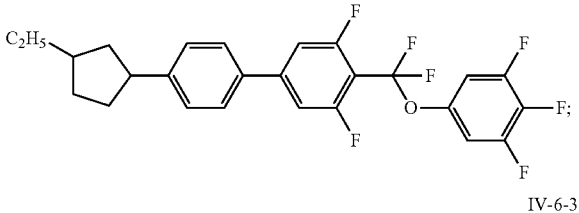
IV-6-3
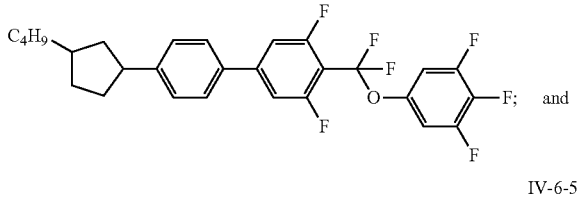
IV-6-4
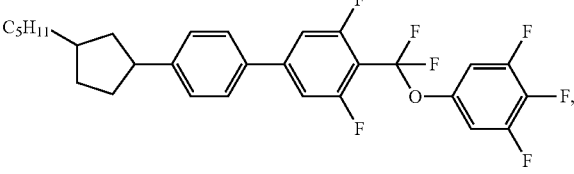  and
IV-6-5
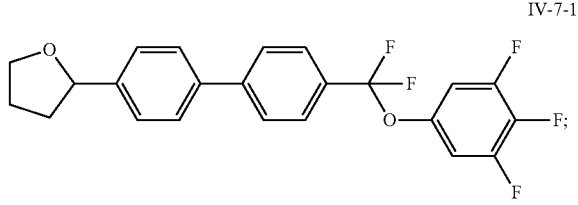
the compound of general formula IV-7 is selected from a group consisting of the following compounds:
IV-7-1
IV-7-2
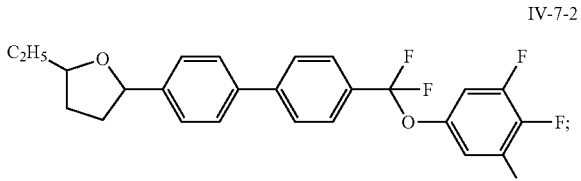

-continued
IV-7-3
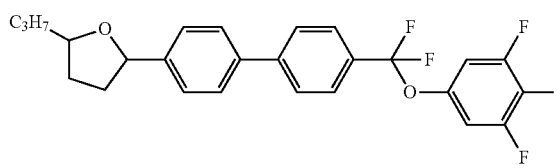
IV-7-4
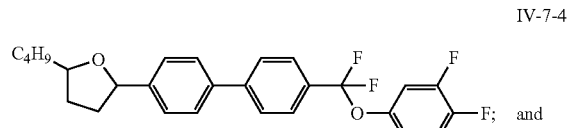 and
IV-7-5
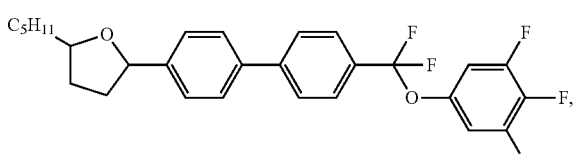
the compound of general formula IV-8 is selected from a group consisting of the following compounds:
IV-8-1
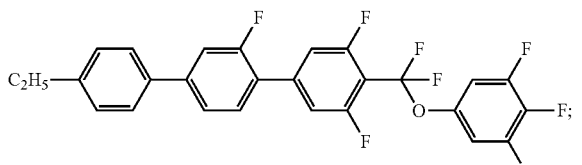
IV-8-2
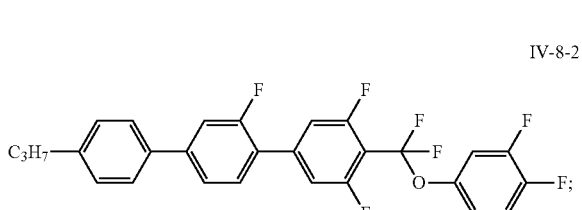
IV-8-3
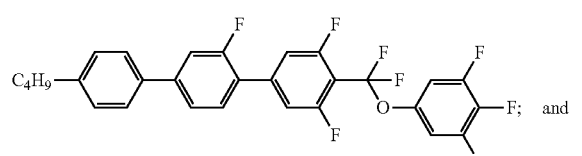 and
IV-8-4
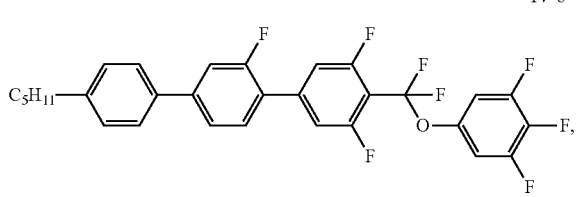
the compound of general formula IV-9 is selected from a group consisting of the following compounds:
IV-9-1
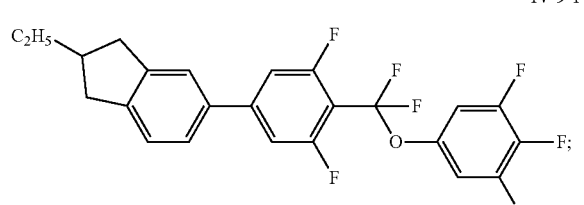
IV-9-2
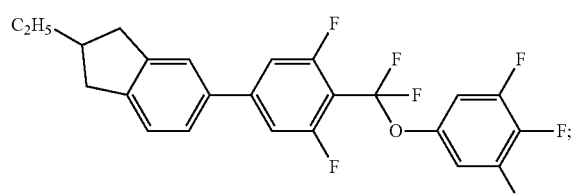
IV-9-3
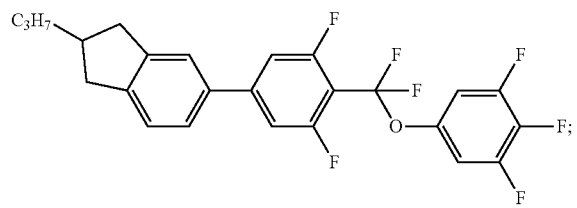 and
IV-9-4
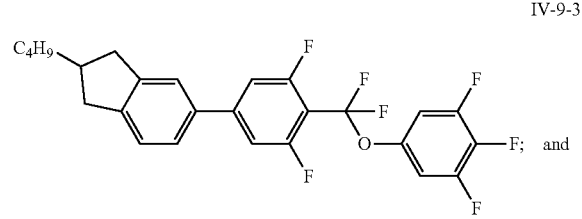
the compound of general formula IV-10 is selected from a group consisting of the following compounds:

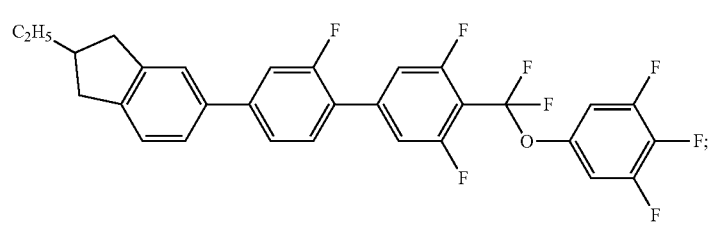
IV-10-1
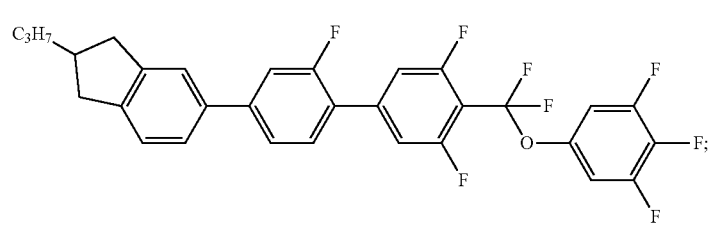
IV-10-2
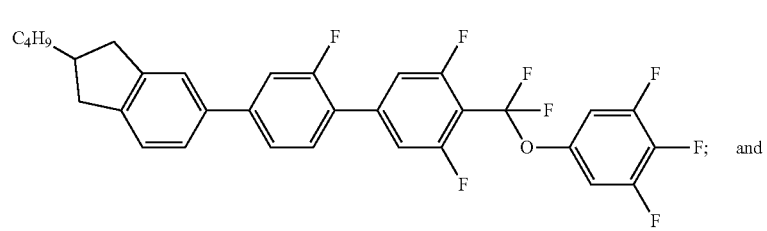
IV-10-3 and
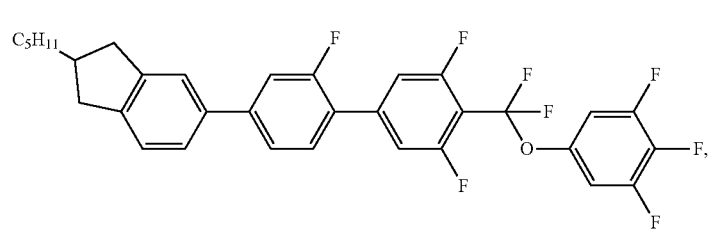
IV-10-4
the compound of general formula IV-11 is selected from a group consisting of the following compounds:
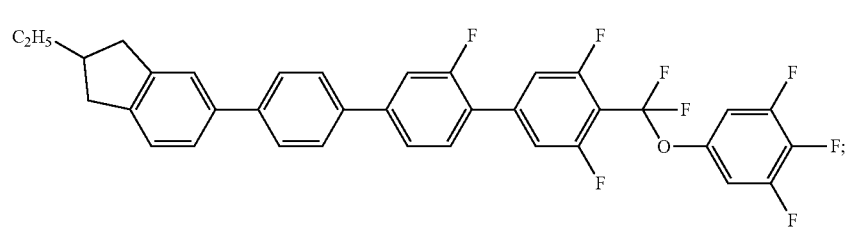
IV-11-1
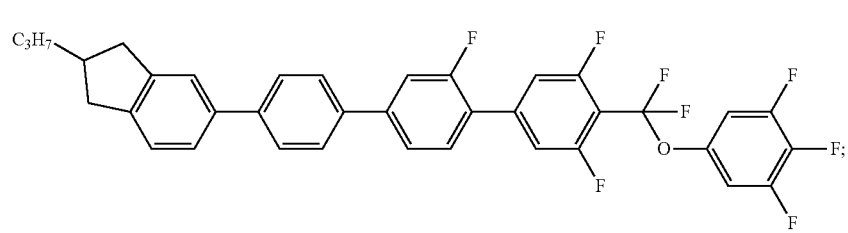
IV-11-2

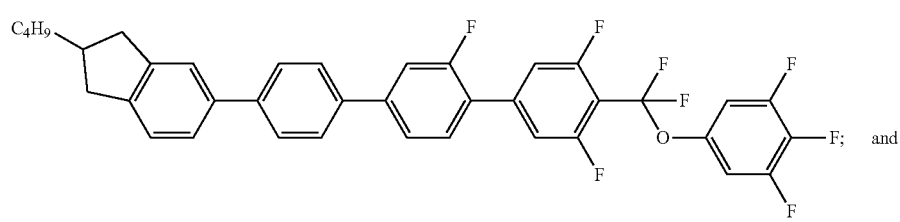
IV-11-3
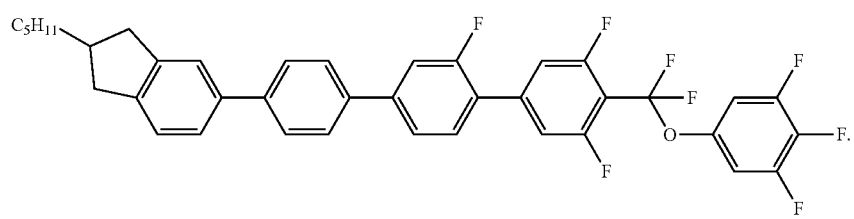
IV-11-4
8. The liquid crystal composition according to claim 1, characterized in that the compound of general formula V is selected from a group consisting of the following compounds:
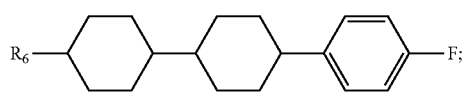
V-1
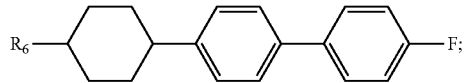
V-2
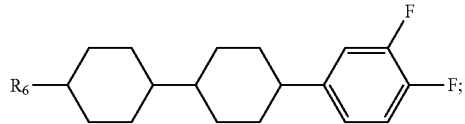
V-3
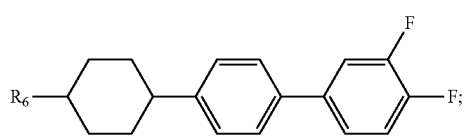
V-4
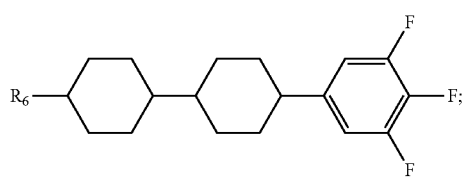
V-5
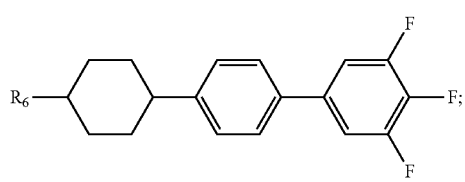
V-6
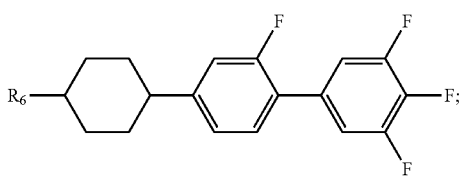
V-7
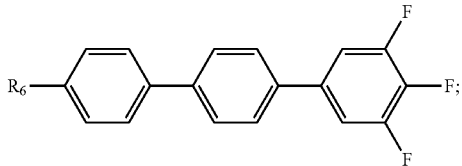
V-8
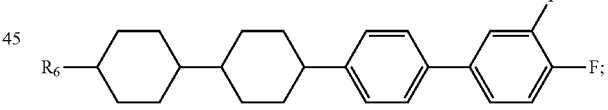
V-9
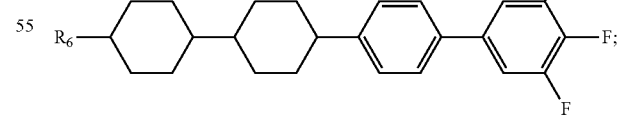
V-10
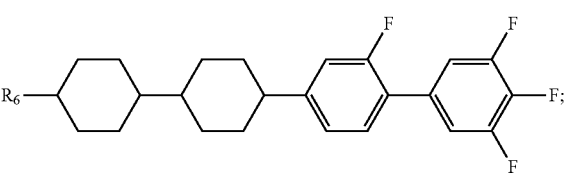
V-11

V-12

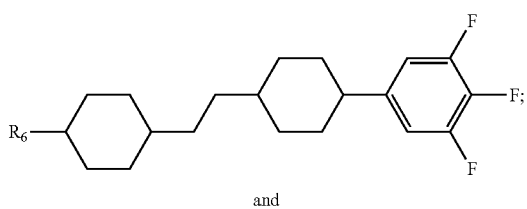

and

V-13

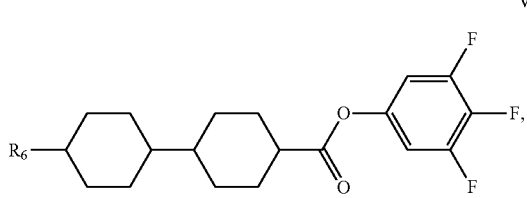

in which,

R$_6$ represents C$_1$-C$_5$ alkyl substituted by fluorine or unsubstituted by fluorine, C$_1$-C$_5$ alkoxy substituted by fluorine or unsubstituted by fluorine, or C$_2$-C$_5$ alkenyl substituted by fluorine or unsubstituted by fluorine.

9. The liquid crystal composition according to claim 8, characterized in that the compound of general formula V-1 is selected from a group consisting of the following compounds:

V-1-1
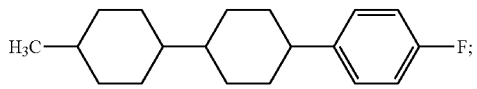

V-1-2
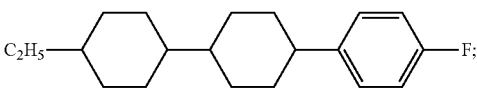

V-1-3
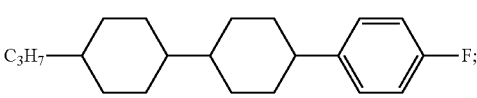

V-1-4
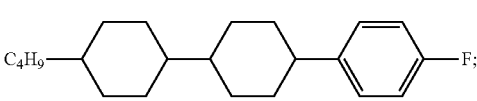

V-1-5
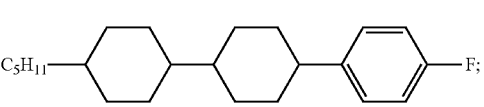

V-1-6
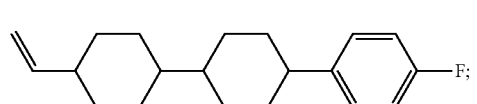

V-1-7
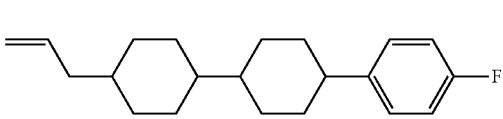 and

V-1-8
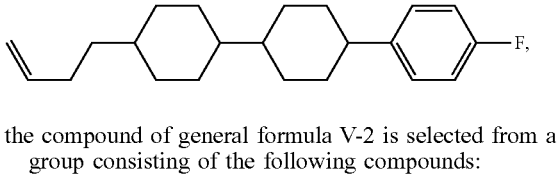

the compound of general formula V-2 is selected from a group consisting of the following compounds:

V-2-1
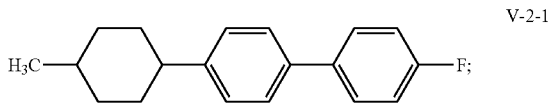

V-2-2
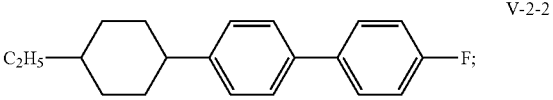

V-2-3
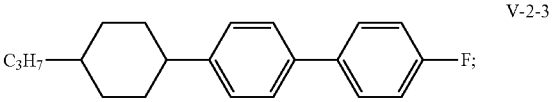

V-2-4
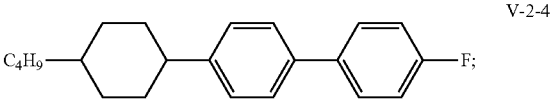

V-2-5
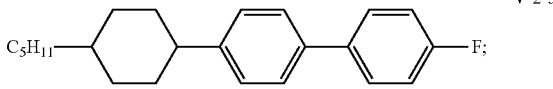

V-2-6
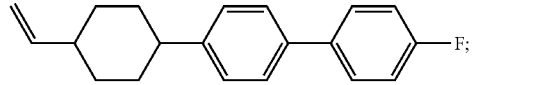

V-2-7
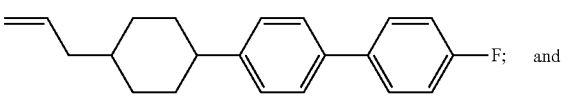 and

V-2-8
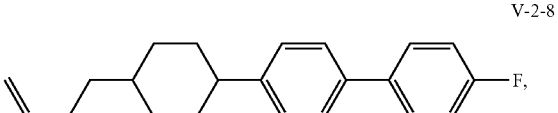

the compound of general formula V-3 is selected from a group consisting of the following compounds:

V-3-1
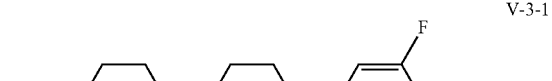

V-3-2
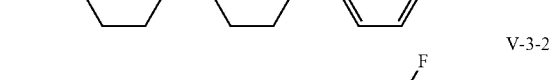

V-3-3
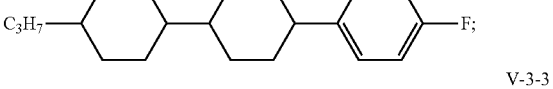

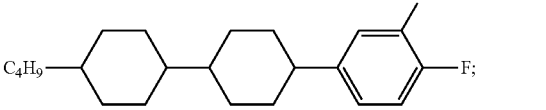

V-3-4
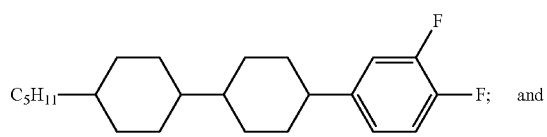
and
V-3-5
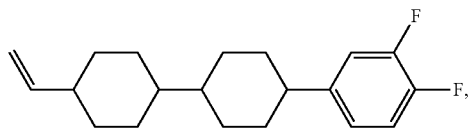
the compound of general formula V-4 is selected from a group consisting of the following compounds:
V-4-1
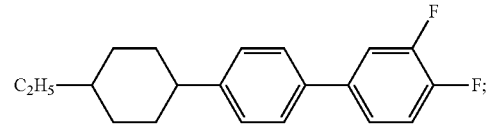
V-4-2
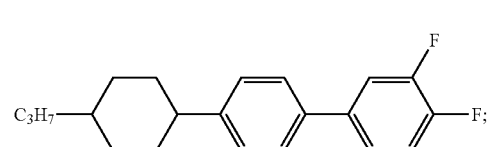
V-4-3
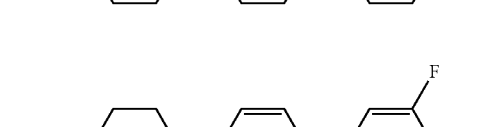
V-4-4
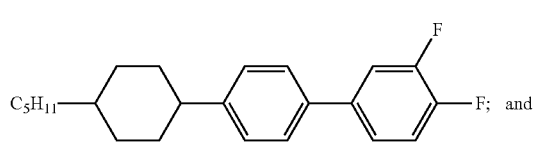
and
V-4-5
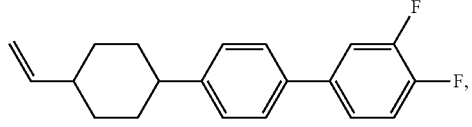
the compound of general formula V-5 is selected from a group consisting of the following compounds:
V-5-1
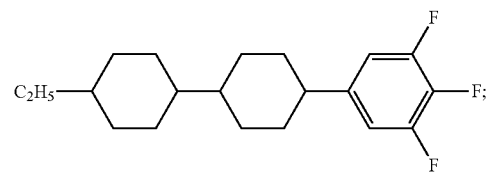
V-5-2
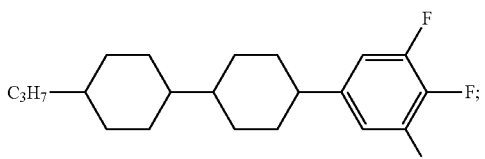
V-5-3
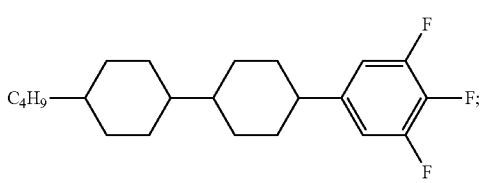
V-5-4
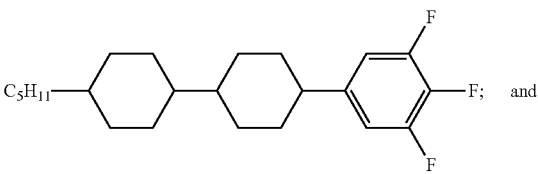
and
V-5-5
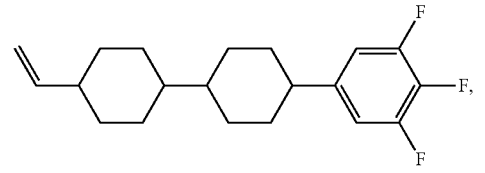
the compound of general formula V-6 is selected from a group consisting of the following compounds:
V-6-1
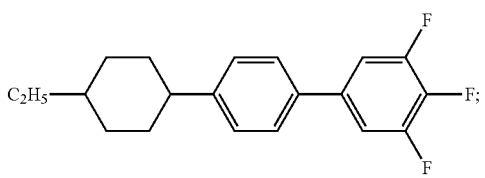
V-6-2
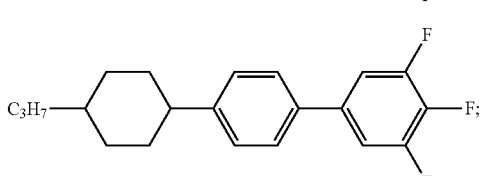
V-6-3
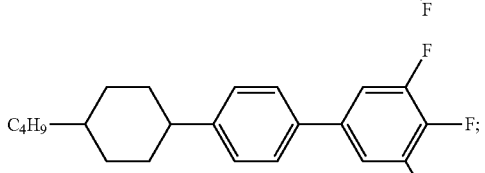
V-6-4
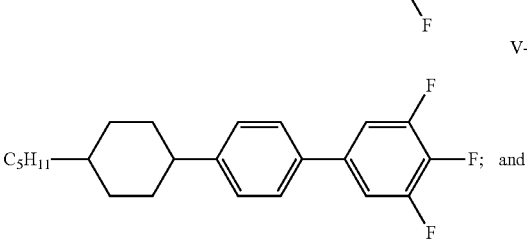
and

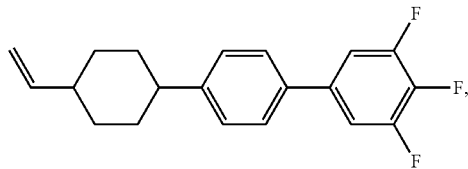
V-6-5
the compound of general formula V-7 is selected from a group consisting of the following compounds:
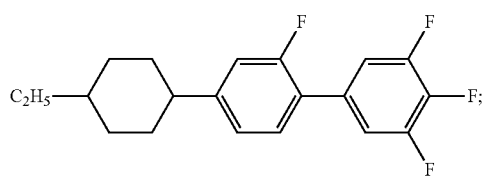
V-7-1
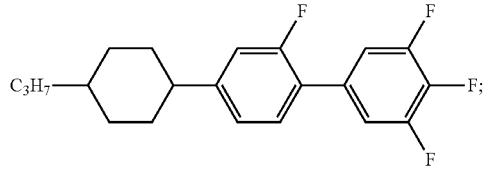
V-7-2
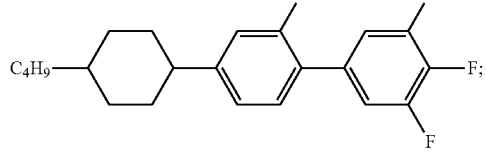
V-7-3
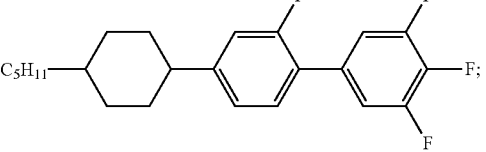
V-7-4
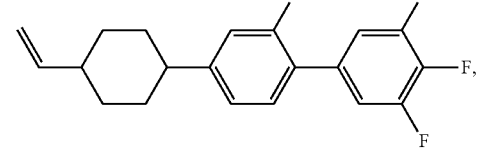
V-7-5
the compound of general formula V-8 is selected from a group consisting of the following compounds:
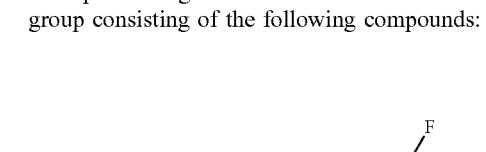
V-8-1
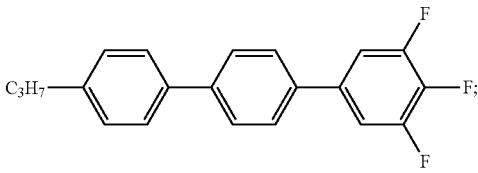
V-8-2
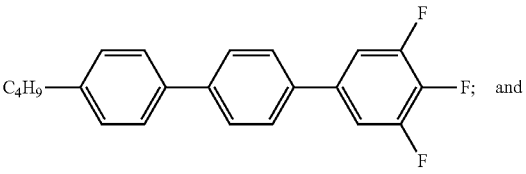
V-8-3
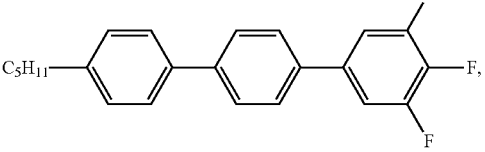
V-8-4
the compound of general formula V-9 is selected from a group consisting of the following compounds:
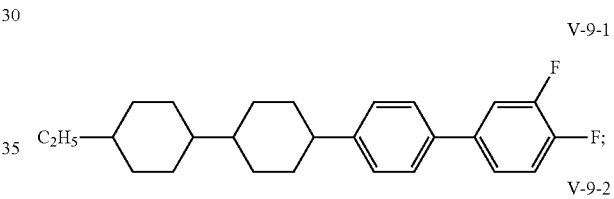
V-9-1
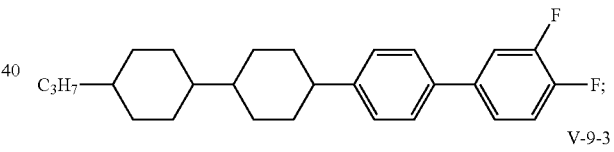
V-9-2
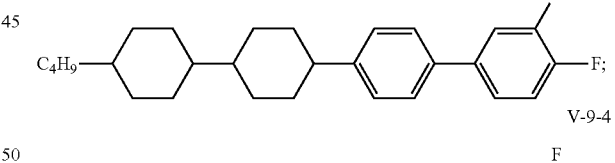
V-9-3
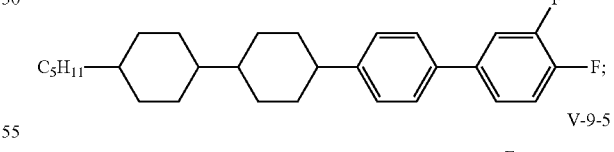
V-9-4
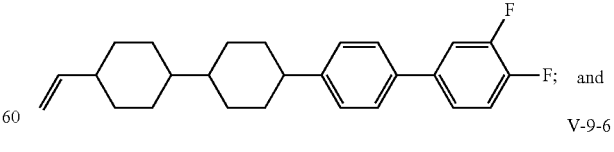
V-9-5
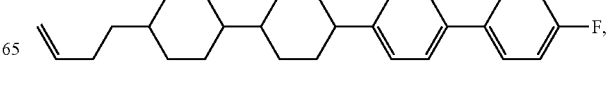
V-9-6 the compound of general formula V-10 is selected from a group consisting of the following compounds:
V-10-1
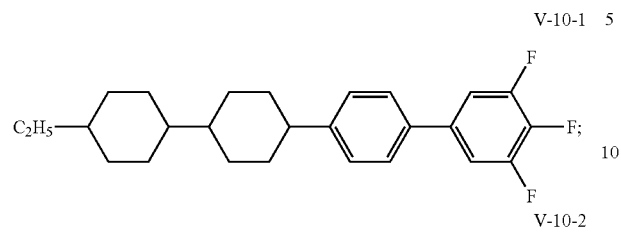
V-10-2
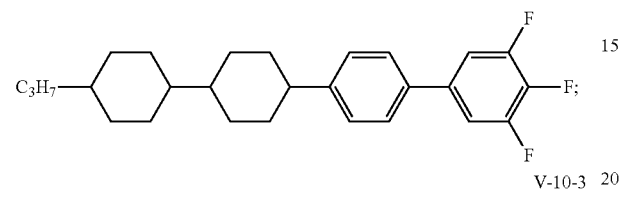
V-10-3
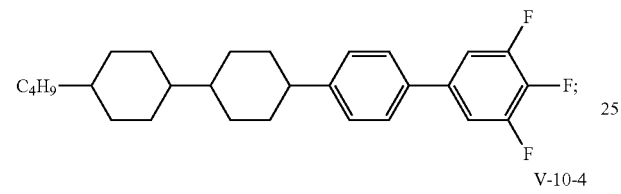
V-10-4
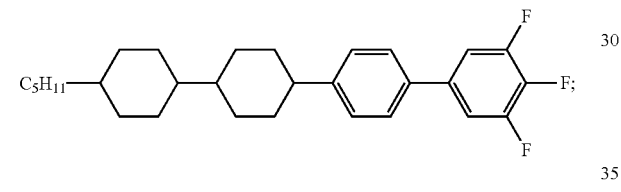
V-10-5
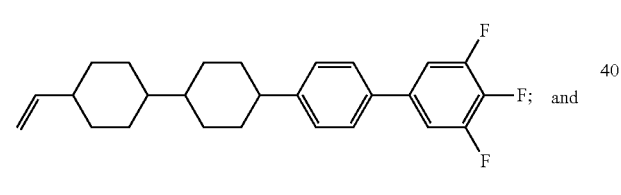
V-10-6
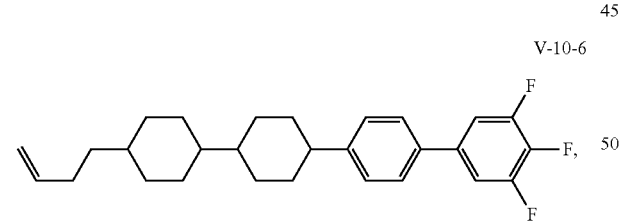
the compound of general formula V-11 is selected from a group consisting of the following compounds:
V-11-1
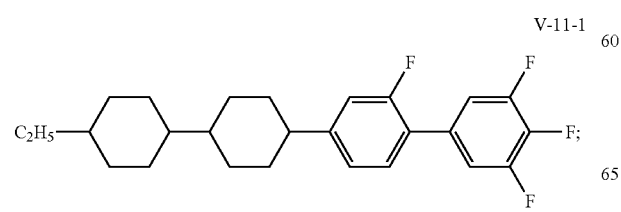
V-11-2
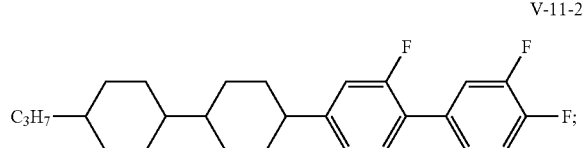
V-11-3
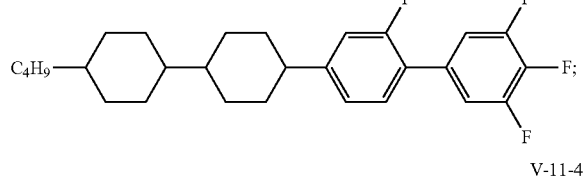
V-11-4
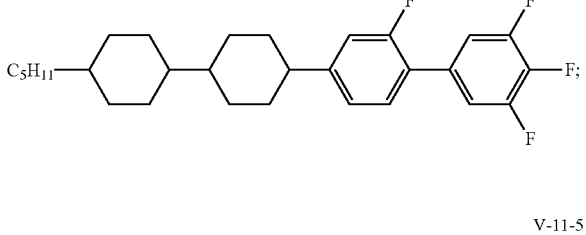
V-11-5
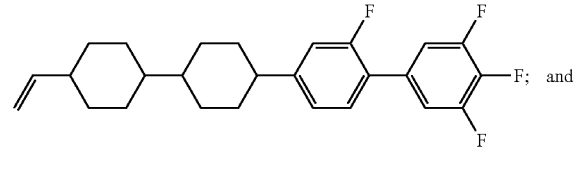
V-11-6
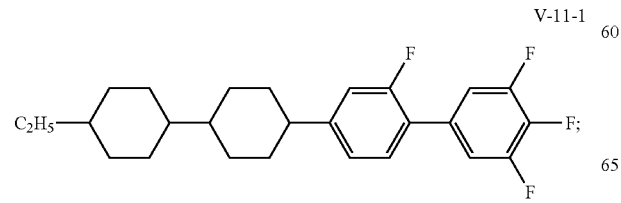
the compound of general formula V-12 is selected from a group consisting of the following compounds:
V-12-1
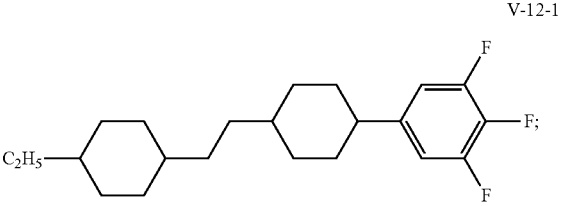
V-12-2
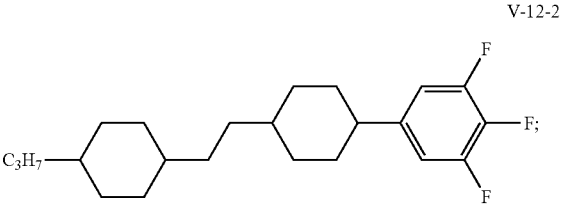

-continued

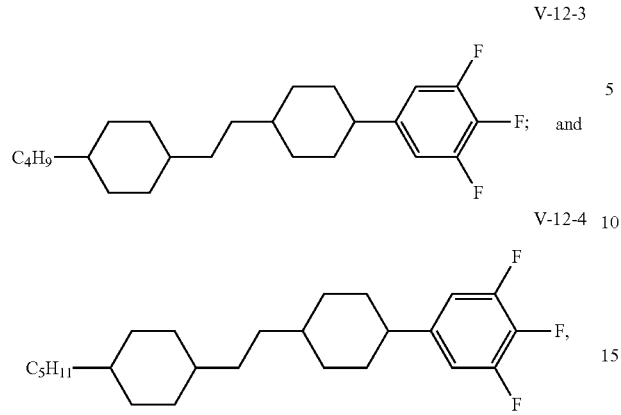

the compound of general formula V-13 is selected from a group consisting of the following compounds:

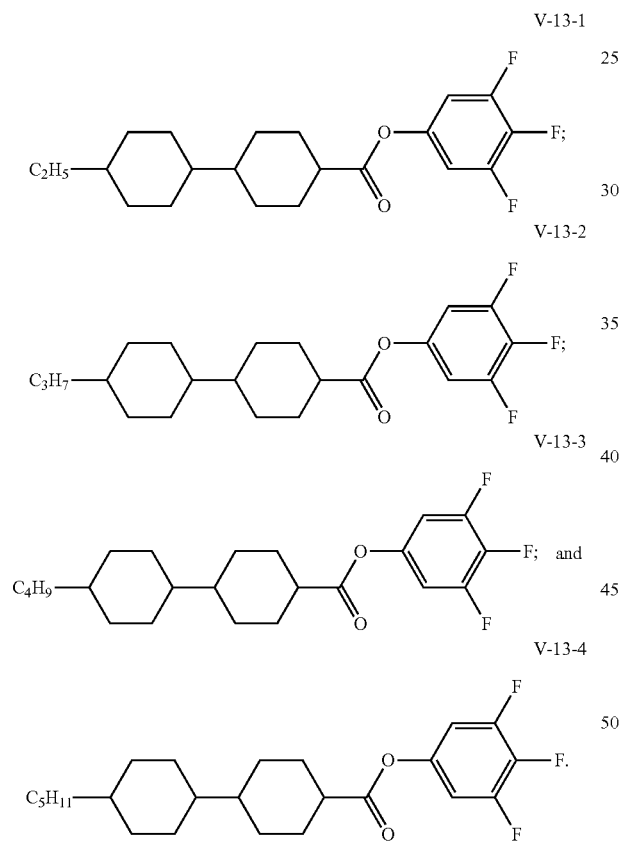

10. The liquid crystal composition according to claim 1, characterized in that the compound of general formula VI is selected from a group consisting of the following compounds:

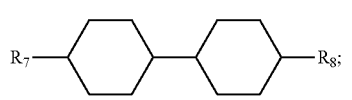

-continued

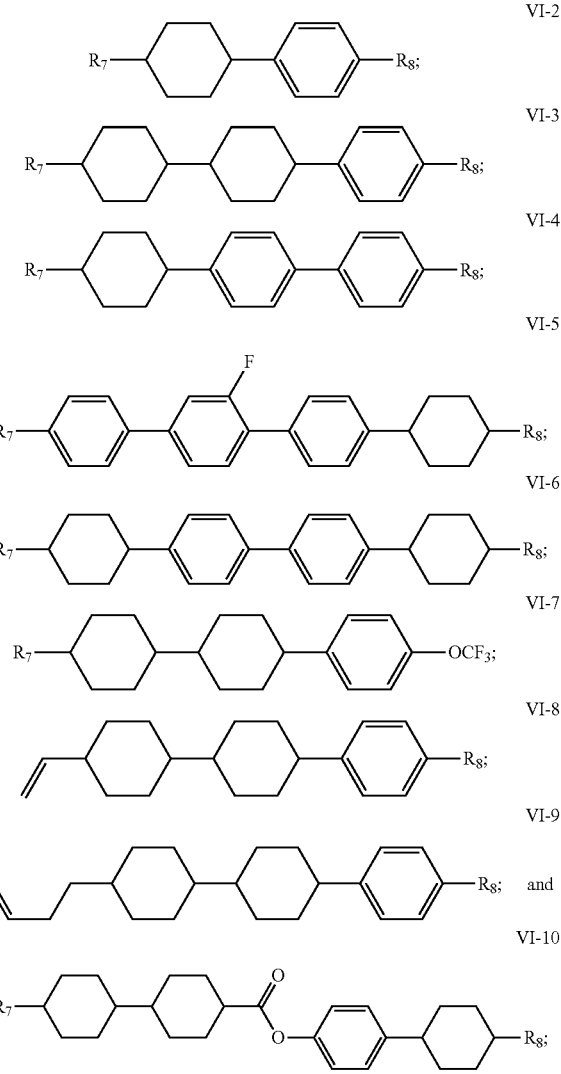

in which, $R_7$ and $R_8$ are same or different, and each independently represents $C_1$-$C_5$ alkyl, $C_1$-$C_5$ alkoxy, $C_2$-$C_5$ alkenyl or $C_2$-$C_5$ alkenoxy.

11. The liquid crystal composition according to claim 10, characterized in that the compound of general formula VI-1 is selected from a group consisting of the following compounds:

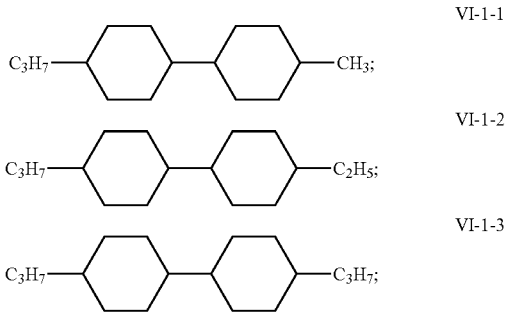

-continued
VI-1-4
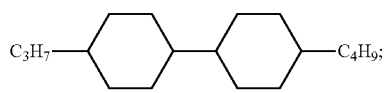
VI-1-5
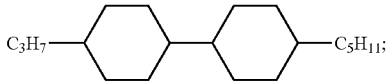
VI-1-6
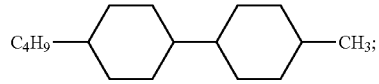
VI-1-7
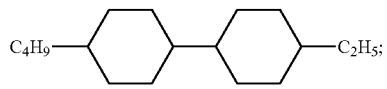
VI-1-8
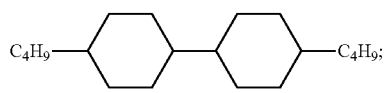
VI-1-9
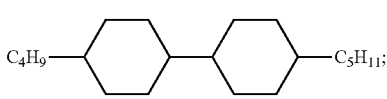
VI-1-10
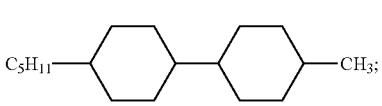
VI-1-11
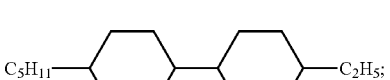
VI-1-12
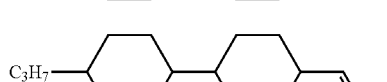
VI-1-13
VI-1-14
VI-1-15
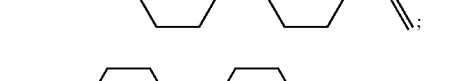; and
VI-1-16
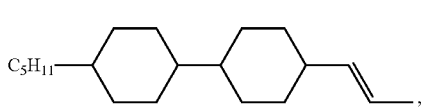,
the compound of general formula VI-2 is selected from a group consisting of the following compounds:
VI-2-1
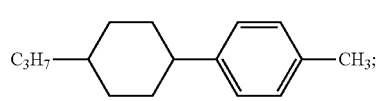
VI-2-2
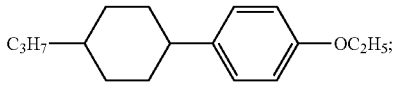
VI-2-3
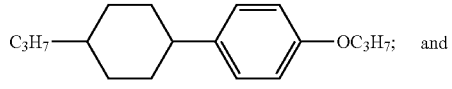; and
VI-2-4
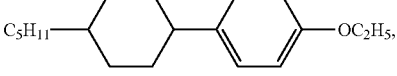,
the compound of general formula VI-3 is selected from a group consisting of the following compounds:
VI-3-1
VI-3-2
VI-3-3
VI-3-4
VI-3-5
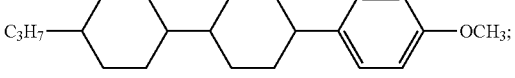
VI-3-6
VI-3-7
VI-3-8
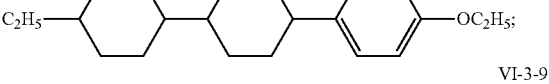
VI-3-9
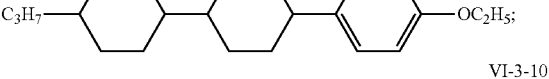
VI-3-10

-continued
VI-3-11
VI-1-12
VI-3-13
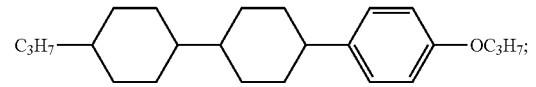
VI-3-14
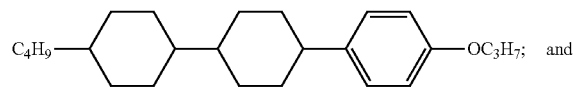 and
VI-3-15
the compound of general formula VI-4 is selected from a group consisting of the following compounds:
VI-4-1
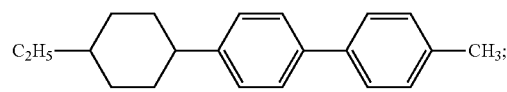
VI-4-2
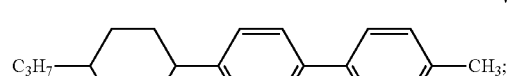
VI-4-3
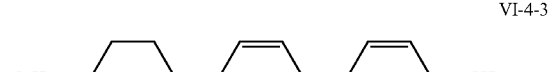
VI-4-4
VI-4-5
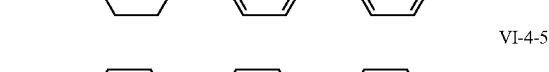
VI-4-6
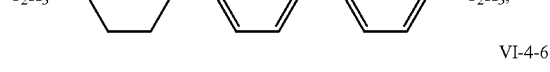
VI-4-7
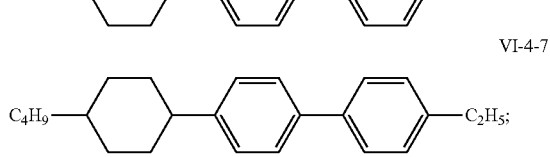
-continued
VI-4-8
VI-4-9
VI-4-10
VI-4-11
VI-4-12
VI-4-13
VI-4-14
VI-4-15
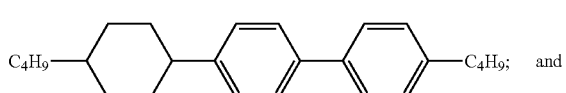 and
VI-4-16
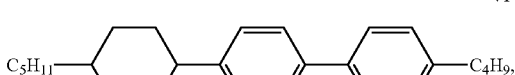
the compound of general formula VI-5 is selected from a group consisting of the following compounds:
VI-5-1
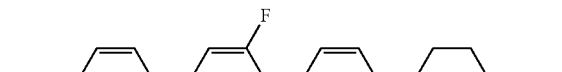
VI-5-2
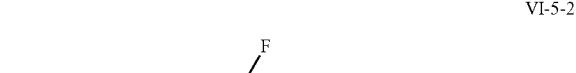
VI-5-3

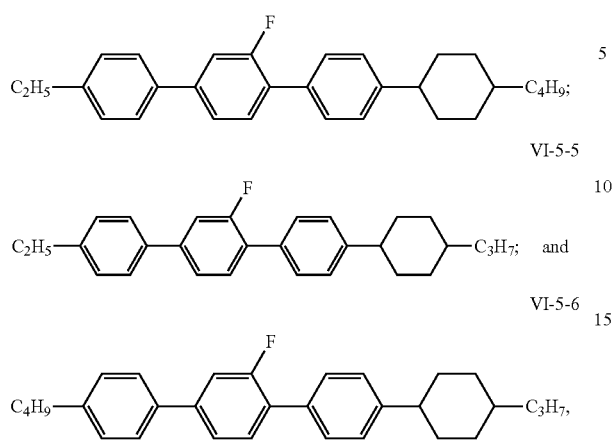

the compound of general formula VI-6 is selected from a group consisting of the following compounds:

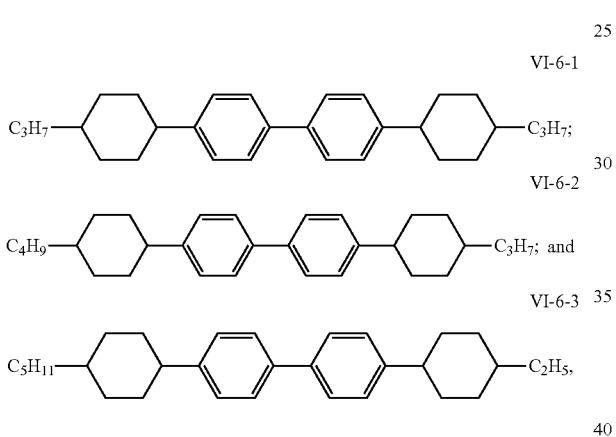

the compound of general formula VI-7 is selected from a group consisting of the following compounds:

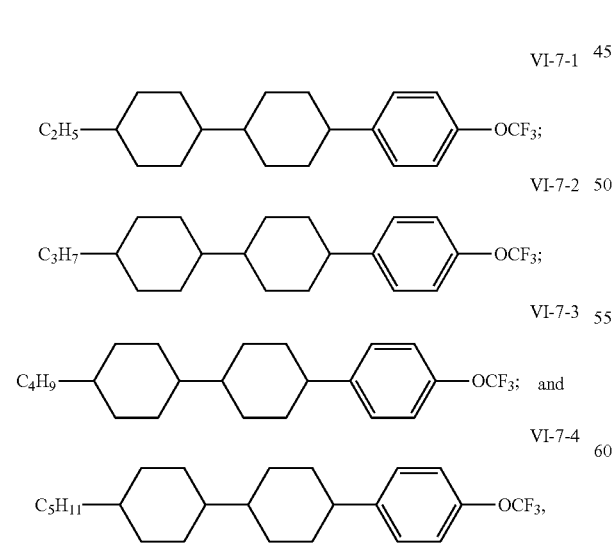

the compound of general formula VI-8 is selected from a group consisting of the following compounds:

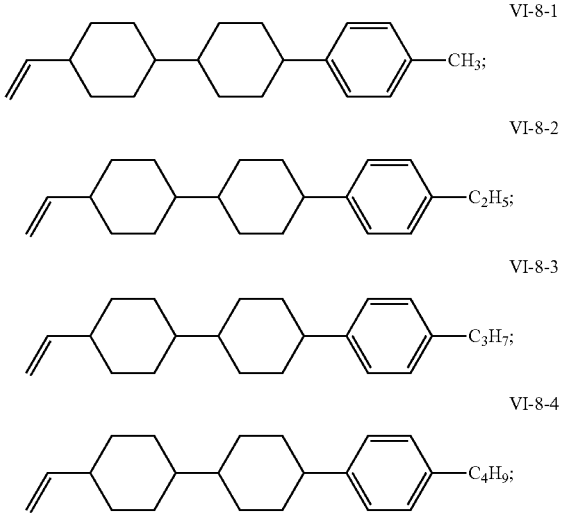

the compound of general formula VI-9 is selected from a group consisting of the following compounds:

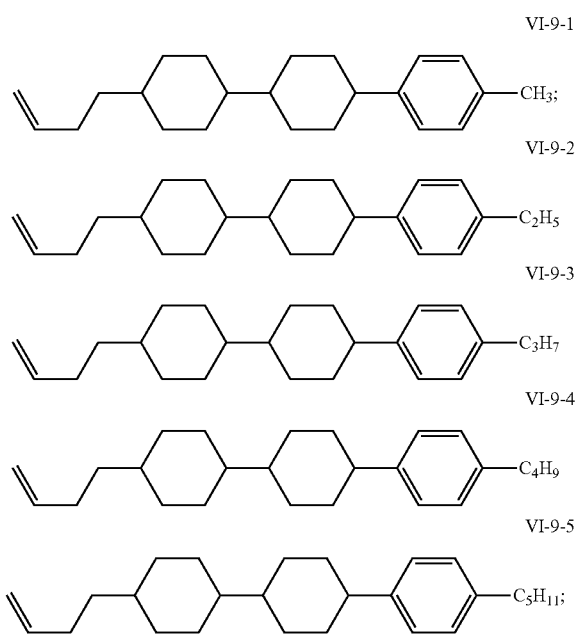

-continued

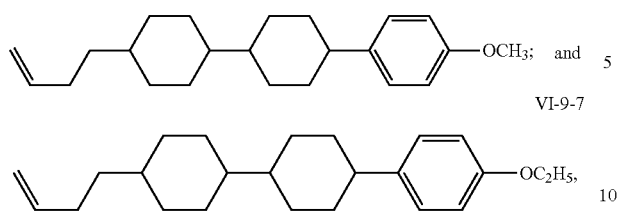

the compound of general formula VI-10 is selected from a group consisting of the following compounds:

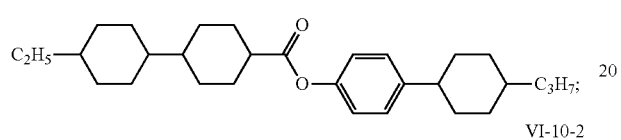

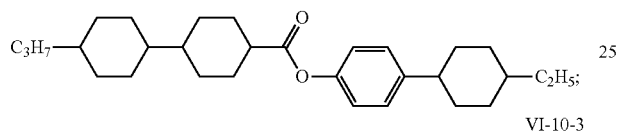

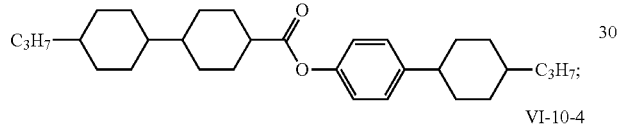

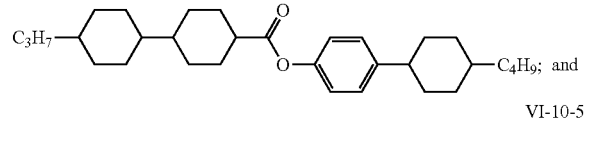

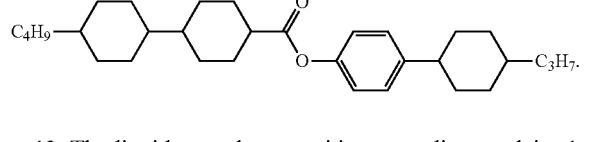

12. The liquid crystal composition according to claim 1, characterized in that the first component comprises 5-15% by weight of the total amount of the liquid crystal composition; the second component comprises 10-20% by weight of the total amount of the liquid crystal composition; the third component comprises 1-10% by weight of the total amount of the liquid crystal composition; the fourth component comprises 10-45% by weight of the total amount of the liquid crystal composition; the fifth component comprises 5-35% by weight of the total amount of the liquid crystal composition; and the sixth component comprises 1-50% by weight of the total amount of the liquid crystal composition.

13. The liquid crystal composition according to claim 12, characterized in that the liquid crystal composition comprises:
3% by weight of the total amount of the liquid crystal composition of compound I-2;
5% by weight of the total amount of the liquid crystal composition of compound I-3;
3% by weight of the total amount of the liquid crystal composition of compound I-4;
5% by weight of the total amount of the liquid crystal composition of compound II-1-3;
6% by weight of the total amount of the liquid crystal composition of compound II-1-4;
6% by weight of the total amount of the liquid crystal composition of compound II-2-2;
3% by weight of the total amount of the liquid crystal composition of compound IV-9-2;
3% by weight of the total amount of the liquid crystal composition of compound IV-8-2;
5% by weight of the total amount of the liquid crystal composition of compound IV-8-3;
6% by weight of the total amount of the liquid crystal composition of compound IV-8-4;
4% by weight of the total amount of the liquid crystal composition of compound V-6-2;
6% by weight of the total amount of the liquid crystal composition of compound V-6-4;
2% by weight of the total amount of the liquid crystal composition of compound VI-4-6;
27% by weight of the total amount of the liquid crystal composition of compound VI-1-2;
10% by weight of the total amount of the liquid crystal composition of compound VI-1-15; and
6% by weight of the total amount of the liquid crystal composition of compound III-5, or the liquid crystal composition comprises:
4% by weight of the total amount of the liquid crystal composition of compound I-3;
4% by weight of the total amount of the liquid crystal composition of compound I-4;
3% by weight of the total amount of the liquid crystal composition of compound II-1-3;
6% by weight of the total amount of the liquid crystal composition of compound II-1-4;
5% by weight of the total amount of the liquid crystal composition of compound II-1-5;
9% by weight of the total amount of the liquid crystal composition of compound IV-1-1;
12% by weight of the total amount of the liquid crystal composition of compound IV-1-2;
20% by weight of the total amount of the liquid crystal composition of compound IV-5-2;
11% by weight of the total amount of the liquid crystal composition of compound V-6-2;
6% by weight of the total amount of the liquid crystal composition of compound V-5-2;
3% by weight of the total amount of the liquid crystal composition of compound V-10-1;
4% by weight of the total amount of the liquid crystal composition of compound V-10-2;
3% by weight of the total amount of the liquid crystal composition of compound V-10-3;
3% by weight of the total amount of the liquid crystal composition of compound VI-1-12; and
7% by weight of the total amount of the liquid crystal composition of compound III-5, or the liquid crystal composition comprises:
4% by weight of the total amount of the liquid crystal composition of compound I-2;
5% by weight of the total amount of the liquid crystal composition of compound I-4;
6% by weight of the total amount of the liquid crystal composition of compound II-1-2;
6% by weight of the total amount of the liquid crystal composition of compound II-1-3;

6% by weight of the total amount of the liquid crystal composition of compound II-1-4;
6% by weight of the total amount of the liquid crystal composition of compound IV-9-1;
5% by weight of the total amount of the liquid crystal composition of compound IV-9-2;
5% by weight of the total amount of the liquid crystal composition of compound V-5-1;
6% by weight of the total amount of the liquid crystal composition of compound V-5-2;
6% by weight of the total amount of the liquid crystal composition of compound V-10-1;
10% by weight of the total amount of the liquid crystal composition of compound V-10-2;
6% by weight of the total amount of the liquid crystal composition of compound V-10-3;
8% by weight of the total amount of the liquid crystal composition of compound VI-7-2;
18% by weight of the total amount of the liquid crystal composition of compound VI-1-12; and
3% by weight of the total amount of the liquid crystal composition of compound III-5, or the liquid crystal composition comprises:
3% by weight of the total amount of the liquid crystal composition of compound I-2;
5% by weight of the total amount of the liquid crystal composition of compound I-3;
5% by weight of the total amount of the liquid crystal composition of compound I-4;
6% by weight of the total amount of the liquid crystal composition of compound II-1-4;
5% by weight of the total amount of the liquid crystal composition of compound II-2-2;
2% by weight of the total amount of the liquid crystal composition of compound IV-9-2;
3% by weight of the total amount of the liquid crystal composition of compound IV-10-2;
5% by weight of the total amount of the liquid crystal composition of compound IV-10-3;
5% by weight of the total amount of the liquid crystal composition of compound IV-10-4;
4% by weight of the total amount of the liquid crystal composition of compound V-6-2;
4% by weight of the total amount of the liquid crystal composition of compound V-6-3;
2% by weight of the total amount of the liquid crystal composition of compound VI-4-6;
37% by weight of the total amount of the liquid crystal composition of compound VI-1-12;
10% by weight of the total amount of the liquid crystal composition of compound VI-1-15; and
4% by weight of the total amount of the liquid crystal composition of compound III-5, or the liquid crystal composition comprises:
3% by weight of the total amount of the liquid crystal composition of compound I-3;
3% by weight of the total amount of the liquid crystal composition of compound I-4;
6% by weight of the total amount of the liquid crystal composition of compound II-1-4;
5% by weight of the total amount of the liquid crystal composition of compound II-2-2;
12% by weight of the total amount of the liquid crystal composition of compound IV-1-1;
12% by weight of the total amount of the liquid crystal composition of compound IV-1-2;
14% by weight of the total amount of the liquid crystal composition of compound IV-5-2;
6% by weight of the total amount of the liquid crystal composition of compound IV-6-1;
5% by weight of the total amount of the liquid crystal composition of compound V-6-2;
6% by weight of the total amount of the liquid crystal composition of compound V-7-2;
7% by weight of the total amount of the liquid crystal composition of compound V-5-2;
3% by weight of the total amount of the liquid crystal composition of compound V-10-1;
4% by weight of the total amount of the liquid crystal composition of compound V-10-2;
3% by weight of the total amount of the liquid crystal composition of compound V-10-3;
6% by weight of the total amount of the liquid crystal composition of compound VI-1-12; and
5% by weight of the total amount of the liquid crystal composition of compound III-5, or the liquid crystal composition comprises:
3% by weight of the total amount of the liquid crystal composition of compound I-2;
3% by weight of the total amount of the liquid crystal composition of compound I-4;
5% by weight of the total amount of the liquid crystal composition of compound II-1-3;
6% by weight of the total amount of the liquid crystal composition of compound II-1-4;
6% by weight of the total amount of the liquid crystal composition of compound II-2-2;
3% by weight of the total amount of the liquid crystal composition of compound IV-9-2;
3% by weight of the total amount of the liquid crystal composition of compound IV-8-2;
5% by weight of the total amount of the liquid crystal composition of compound IV-8-3;
6% by weight of the total amount of the liquid crystal composition of compound IV-8-4;
5% by weight of the total amount of the liquid crystal composition of compound V-3-2;
5% by weight of the total amount of the liquid crystal composition of compound V-4-2;
4% by weight of the total amount of the liquid crystal composition of compound V-6-2;
6% by weight of the total amount of the liquid crystal composition of compound V-6-4;
2% by weight of the total amount of the liquid crystal composition of compound VI-4-6;
25% by weight of the total amount of the liquid crystal composition of compound VI-1-12;
10% by weight of the total amount of the liquid crystal composition of compound VI-1-15; and
3% by weight of the total amount of the liquid crystal composition of compound III-8, or the liquid crystal composition comprises:
4% by weight of the total amount of the liquid crystal composition of compound I-2;
5% by weight of the total amount of the liquid crystal composition of compound I-4;
6% by weight of the total amount of the liquid crystal composition of compound II-1-2;
6% by weight of the total amount of the liquid crystal composition of compound II-1-3;
6% by weight of the total amount of the liquid crystal composition of compound II-1-4;

6% by weight of the total amount of the liquid crystal composition of compound IV-9-1;
5% by weight of the total amount of the liquid crystal composition of compound IV-9-2;
5% by weight of the total amount of the liquid crystal composition of compound V-5-1;
5% by weight of the total amount of the liquid crystal composition of compound V-5-2;
6% by weight of the total amount of the liquid crystal composition of compound V-10-1;
10% by weight of the total amount of the liquid crystal composition of compound V-10-2;
6% by weight of the total amount of the liquid crystal composition of compound V-10-3;
12% by weight of the total amount of the liquid crystal composition of compound VI-1-12;
8% by weight of the total amount of the liquid crystal composition of compound VI-7-2; and
10% by weight of the total amount of the liquid crystal composition of compound III-4,
or the liquid crystal composition comprises:
4% by weight of the total amount of the liquid crystal composition of compound I-1;
4% by weight of the total amount of the liquid crystal composition of compound I-2;
3% by weight of the total amount of the liquid crystal composition of compound II-1-3;
6% by weight of the total amount of the liquid crystal composition of compound II-1-4;
5% by weight of the total amount of the liquid crystal composition of compound II-1-5;
9% by weight of the total amount of the liquid crystal composition of compound IV-1-1;
12% by weight of the total amount of the liquid crystal composition of compound IV-1-2;
20% by weight of the total amount of the liquid crystal composition of compound IV-5-2;
11% by weight of the total amount of the liquid crystal composition of compound V-6-2;
6% by weight of the total amount of the liquid crystal composition of compound V-5-2;
3% by weight of the total amount of the liquid crystal composition of compound V-10-1;
4% by weight of the total amount of the liquid crystal composition of compound V-10-2;
3% by weight of the total amount of the liquid crystal composition of compound V-10-3;
3% by weight of the total amount of the liquid crystal composition of compound VI-1-12; and
7% by weight of the total amount of the liquid crystal composition of compound III-2.

14. A liquid crystal display device comprising the liquid crystal composition of claim 1.

* * * * *